United States Patent
Torchia et al.

(10) Patent No.: US 10,119,010 B2
(45) Date of Patent: Nov. 6, 2018

(54) STABILIZED POLYMER COMPOSITIONS AND METHODS OF MAKING SAME

(71) Applicant: Baerlocher GmbH, Unterschleissheim (DE)

(72) Inventors: Steven R. Torchia, Cincinnati, OH (US); Rich Hudson, Cincinnati, OH (US); Tatiana Romanova, Loveland, OH (US)

(73) Assignee: Baerlocher GmbH, Unterschleissheim (DE)

( * ) Notice: Subject to any disclaimer, the term of this patent is extended or adjusted under 35 U.S.C. 154(b) by 0 days.

(21) Appl. No.: 14/777,184

(22) PCT Filed: Mar. 17, 2014

(86) PCT No.: PCT/EP2014/055350
§ 371 (c)(1),
(2) Date: Sep. 15, 2015

(87) PCT Pub. No.: WO2014/140383
PCT Pub. Date: Sep. 18, 2014

(65) Prior Publication Data
US 2016/0032078 A1 Feb. 4, 2016

Related U.S. Application Data

(60) Provisional application No. 61/789,731, filed on Mar. 15, 2013.

(30) Foreign Application Priority Data

Aug. 21, 2013 (EP) .................................... 13181133

(51) Int. Cl.
| | | |
|---|---|---|
| *C08K 5/00* | (2006.01) | |
| *C08L 23/00* | (2006.01) | |
| *C08K 5/52* | (2006.01) | |
| *C08K 5/098* | (2006.01) | |
| *C08K 3/22* | (2006.01) | |
| *C08K 5/134* | (2006.01) | |
| *C08K 3/01* | (2018.01) | |

(52) U.S. Cl.
CPC .................. *C08K 5/52* (2013.01); *C08K 3/01* (2018.01); *C08K 3/22* (2013.01); *C08K 5/005* (2013.01); *C08K 5/098* (2013.01); *C08K 5/134* (2013.01); *C08K 2003/2296* (2013.01)

(58) Field of Classification Search
CPC ....... C08L 23/00; C08L 23/16; C08K 3/0041; C08K 3/20; C08K 2003/2206; C08K 2003/222; C08K 2003/2224; C08K 3/34; C08K 5/005; C08K 5/098; C08K 3/22; C08K 2003/2296
See application file for complete search history.

(56) References Cited

U.S. PATENT DOCUMENTS

| | | | | | |
|---|---|---|---|---|---|
| 3,647,704 | A | * | 3/1972 | Schrantz .................... | C08J 3/22 502/216 |
| 4,251,407 | A | * | 2/1981 | Schroeder ................ | C08K 3/22 524/400 |
| 4,307,027 | A | * | 12/1981 | Borzelli ................ | C07C 51/412 554/156 |
| 4,454,281 | A | * | 6/1984 | Heitz ........................ | C08K 3/36 523/100 |
| 4,576,983 | A | * | 3/1986 | Chatterjee .......... | C08K 5/34924 524/101 |
| 4,692,489 | A | * | 9/1987 | Ficker .................... | C08K 5/098 524/218 |
| 4,857,230 | A | * | 8/1989 | Matsumura .............. | C08K 3/26 252/400.24 |
| 5,164,523 | A | * | 11/1992 | Hudson ................. | C07C 51/412 554/128 |
| 5,240,642 | A | * | 8/1993 | Neri ...................... | C08K 5/1345 252/189 |
| 5,597,857 | A | * | 1/1997 | Thibaut .................. | C08K 5/098 252/400.1 |
| 5,844,042 | A | * | 12/1998 | Neri .......................... | C08J 3/22 252/397 |

(Continued)

FOREIGN PATENT DOCUMENTS

| | | | | |
|---|---|---|---|---|
| CN | 100429259 C | | 10/2008 | |
| CN | 101575422 A | * | 11/2009 | ............... C08K 5/00 |

(Continued)

OTHER PUBLICATIONS

JP 2002-146121 A (Kawakami, S) May 22, 2002; machine translation.*
PCT International Search Report dated Jun. 4, 2014 issued during the prosecution of the corresponding PCT International Application No. PCT/EP2014/055350.
Office Action dated Aug. 17, 2016 issued in corresponding Singapore Patent Application No. SG11201507158W 20140317.
Office Action dated Apr. 28, 2017 during the prosecution of Chinese Patent Application No. 201480028579.0.
Official Notice for Filing Response dated May 24, 2018 during the prosecution of Korean Patent Application No. 10-2015-7029338.

*Primary Examiner* — Rip A Lee
(74) *Attorney, Agent, or Firm* — Troutman Sanders LLP

(57) ABSTRACT

The invention relates to stabilizer compositions for polymers such as polyolefin polymers, which decrease a phosphorus based stabilizer content necessary to stabilize the polymer. The premixed stabilizer compositions include an antacid, an organic acid-metal salt, and a primary antioxidant such as a sterically-hindered phenolic compound, a sterically-hindered amine compound, a hydroxylamine compound, and combinations thereof. The premixed stabilizer may further include a portion of the phosphorus based stabilizer content necessary to stabilize the polymer. The invention also relates to a method for the preparation of the stabilized polymer compositions provided by the use thereof.

6 Claims, 6 Drawing Sheets

(56) References Cited

U.S. PATENT DOCUMENTS

| | | | | |
|---|---|---|---|---|
| 5,846,656 A * | 12/1998 | Dunski | ................ | B01J 2/28 428/402 |
| 6,069,196 A * | 5/2000 | Akao | ................ | C08K 5/0008 524/107 |
| 6,143,814 A * | 11/2000 | Schiller | ................ | C08K 3/0008 252/367.1 |
| 6,162,836 A * | 12/2000 | Kato | ................ | C07C 51/412 162/179 |
| 6,251,972 B1 * | 6/2001 | Hoffmann | ................ | C08K 3/22 106/286.6 |
| 6,689,894 B1 * | 2/2004 | Chen | ................ | C07C 51/412 554/156 |
| 6,800,228 B1 * | 10/2004 | Semen | ................ | B01J 2/20 252/182.29 |
| 6,867,250 B1 * | 3/2005 | Gupta | ................ | C08K 5/3492 524/100 |
| 6,869,992 B2 * | 3/2005 | Gugumus | ................ | C08K 5/005 252/401 |
| 8,178,017 B2 * | 5/2012 | Awa | ................ | B01J 2/10 252/397 |
| 8,486,303 B2 * | 7/2013 | Kimura | ................ | C08K 5/372 252/397 |
| 2003/0198886 A1 * | 10/2003 | Chen | ................ | G03G 9/09791 430/137.11 |
| 2005/0006628 A1 | 1/2005 | Gugumus | | |
| 2005/0009967 A1 * | 1/2005 | Zahalka | ................ | C07F 9/65742 524/116 |
| 2007/0202965 A1 * | 8/2007 | Shindo | ................ | A63B 37/0051 473/351 |
| 2008/0242788 A1 * | 10/2008 | Kimura | ................ | C08K 5/005 524/451 |
| 2010/0152341 A1 * | 6/2010 | Chatterjee | ................ | C08K 3/22 524/91 |
| 2013/0172455 A1 * | 7/2013 | Tanji | ................ | C08K 3/22 524/108 |

FOREIGN PATENT DOCUMENTS

| | | | |
|---|---|---|---|
| CN | 101602863 A * | 12/2009 | ............ C07C 51/41 |
| EP | 0565184 A1 | 10/1993 | |
| JP | 2002-146121 A * | 5/2002 | ............ C08L 23/06 |
| KR | 1003761800000 B1 | 8/2003 | |
| WO | WO 97/00907 A1 * | 1/1997 | ............ C08K 5/098 |
| WO | 2009/007265 A1 | 1/2009 | |
| WO | WO 2012/063814 A1 * | 5/2012 | ............ C08L 23/10 |
| WO | 2014/074596 A1 | 5/2014 | |

* cited by examiner

STABILIZED POLYMER COMPOSITIONS AND METHODS OF MAKING SAME

CROSS-REFERENCE TO RELATED APPLICATIONS

This application is the U.S. National Phase of International Patent Application Serial No. PCT/EP2014/055350, filed Mar. 17, 2014, which claims priority to U.S. Provisional Application Ser. No. 61/789,731, filed Mar. 15, 2013 and European Patent Application No. 13181133.3, filed Aug. 21, 2013, both of which are incorporated herein by reference in their entirety.

FIELD OF THE INVENTION

The invention relates generally to stabilized polymer compositions and methods of making same, and more particularly relates to stabilizers compositions that reduce or eliminate the need to use phosphorous based stabilizers.

BACKGROUND

A primary challenge with processing and storing most polymers, especially polyolefinic polymers, styrenic polymers, and poly(meth)acrylate polymers, is the susceptibility of the polymer to undergo oxidative degradation. Polymeric compounds, for example polyolefins like polyethylene and polypropylene, undergo radical driven degradation processes especially during elevated temperature processing steps which might include moulding, extrusion etc. For example, during melt-extrusion, the rate of oxidation of melted polymeric materials gradually increases as the polymeric materials are brought to their melting temperature. The polymeric materials degenerate in the presence of the ambient oxygen to low molecular weight gels, discolored condensates and the like. The origin of the initiating radical species of the degradation process is not completely understood, but under heat processing, peroxide radicals are formed by reaction with molecular oxygen. The peroxide radicals in turn create alkyl radicals by abstracting hydrogen radicals from the polymer backbone, which leads to cross-linking and chain scission. However, degradation even proceeds during end-use by a radical mechanism under the influence of light, heat etc. and will finally destroy the polymer properties.

There are many methods described in the prior art that address stabilization of polymers during processing to alleviate the effects of heat, shear, and degradation of the polymer architecture. A wide variety of chemical additive claims have been made, which typically call out a common formulae to include at least a phenolic antioxidant, a phosphorous based stabilizers, and an antacid. Additionally, the prior art also teaches compaction and extrusion techniques to convert these common formulae of powder materials into non-dusting physical forms which can improve the chemical hygiene of handling the materials. For example, EP 0565184 describes a process for obtaining granular forms from mixtures of powders of two or more additives for organic polymers by extruding the mixture at a temperature between the melting point of the component with the lowest melting point and 140° C. And U.S. Pat. No. 6,143,814 describes a fusible stabilizer composition that is produced by a method in which at least one metal carboxylate is produced in situ from a corresponding carboxylic acid melt and an at most stoichiometric quantity of metal oxide, hydroxide, carbonate, and/or basic metal carbonate, wherein the carboxylate is held in the melt, until further fusible or softenable components are then added with stirring, and then all non-fusible components are added. However, both of these references disclose the use of phosphorus based stabilizers and are silent with respect to minimizing their presence.

However, there numerous deficiencies caused by the use of the phosphorous based stabilizers (e.g., phosphite and phosphonite compounds). For example, phosphites are known to hydrolyze, leaving behind black specs in the polymer and contributing to discoloration.

Moreover, many studies have been performed on the physical parameters of phosphorus based stabilizers, which include diffusion coefficient in polymer and equilibrium solubility. The most common commercial phosphite[tris(2, 4-di-t-butylphenyl)-phosphite] (CAS #31570-04-4), has very low solubility in polyolefins which leads to a phenomenon called blooming. Blooming of the phosphite based stabilizer causes the material to plate out on equipment and remain on the surface of the polymer after processing, thus requiring treatment.

There are critical parameters when food and medical applications are considered. Migration of the additives used for stabilization of the polymer during processing must be suitable for these uses, but more importantly, because the additives will undergo chemical reaction during processing it is imperative that the by-products of the stabilization additives are not harmful. One case where use of phosphite type stabilizer has come under scrutiny is very commonly used phosphite, trisnonylphenol phosphite (TNPP), (CAS #26523-78-4). Although TNPP has limited environmental and human health concerns, its hydrolysis product yields nonylphenol which is under scrutiny by the U.S. Environmental Protection Agency (see e.g., U.S. EPA Nonylpheonl (NP) and NonylphenolEthoxylates (NPEs) Action Plan, RIN 2070-ZA09, Aug. 18, 2010). Moreover, because the environmental and human health issues are a global concern, the use of TNPP has been regulated out of polymers in some countries. While free nonylphenol content may be negligible in commercially available TNPP products, the hydrolysis of TNPP yielding nonylphenol presents concerns with its use and as such the industry is seeking alternatives.

Unfortunately, many of the commercially available phosphorous based antioxidants, e.g., bis(2,4-di-t-butylphenyl) pentaerythritol diphosphite, bis(2,4-dicumylphenyl)pentaerythritol diphosphite, distearyl pentaerythritol diphosphite, (CAS #87498-44-0, CAS #154862-43-8, CAS #38613-77-3, CAS 119345-01-6, CAS #3806-34-6), also suffer from similar deficiencies.

Therefore, a need exists for new methods of stabilizing polymers, which can decrease or eliminate the need for phosphorus based stabilizers.

SUMMARY

Embodiments of the present invention overcome the foregoing problems and other shortcomings, drawbacks, and challenges of stabilizing polymer compositions with elevated levels of phosphorus based stabilizers. While the invention will be described in connection with certain embodiments, it will be understood that the invention is not limited to these embodiments. To the contrary, this invention includes all alternatives, modifications, and equivalents as may be included within the scope of the present invention.

According to one embodiment of the present invention, a stabilized polymer composition with a decreased phosphorus based stabilizer content necessary to stabilize a polymer is provided. The stabilized polymer composition comprises a polymer and about 50 parts per million (ppm) to about 20,000 ppm of a stabilizer composition. The stabilizer composition comprises (a) about 1 wt % to about 60 wt % based on the total weight of the stabilizer composition of an antacid which does not fall under the compounds of (b), preferably selected from the group consisting of metal oxides, metal hydroxides, metal carbonates, metal bicarbonates, natural hydrotalcites, synthetic hydrotalcites, natural hydrocalumites, synthetic hydrocalumites, pyrocatecholates, zeolites, silicates, and combinations thereof; (b) about 10 wt % to about 69 wt % based on the total weight of the stabilizer composition of an organic acid-metal salt having a general formula M1Ym, wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof; wherein Y is a conjugate base of an organic acid, having from six to twenty-four carbon atoms, selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, dicarboxylic acid, polyprotic carboxylic acids, and combinations thereof; and wherein m is an integer from 1 to 3; (c) about 30 wt % to about 89 wt % based on the total weight of the stabilizer composition of a primary antioxidant selected from the group consisting of sterically hindered phenolic compounds, hindered amine compounds, hydroxylamine compounds, and combinations thereof; and (d) 0 to 59 wt % based on the total weight of the stabilizer composition of a stabilizer containing a P-atom, especially of a stabilizer selected from the group comprising phosphites and phosphonites.

The wt % is based on the total weight of the stabilizer composition.

The polymer is preferably selected from the group consisting of a polyolefin polymer, a styrenic polymer, a poly (meth)acrylate polymer, and combinations thereof.

According to one embodiment of the invention, at least two of the following conditions under multi pass extrusion of the stabilized polymer composition are met:
a) the melt flow ratio (MFR) in g/10 min, 190° C., 10 kg, of the stabilized polymer after the fifth pass of a multi pass extrusion is less than 10% higher than the MFR after the first pass or it is lower,
b) the yellowness index (YI) of the stabilized polymer after one pass is less than 0 and less than the YI of the polymer extruded under the same conditions without stabilizer,
c) the YI of the stabilized polymer after 1 pass is less than 1,
d) the YI of the stabilized polymer after 5 passes is less than 0,
e) the oxidative induction time (OIT) of the stabilized polymer measured according to ASTM D 3895 (200° C., O2) of a sample comprising phosphite or phosphonite is higher than the OIT of a sample tested under the same conditions comprising more of the respective phosphite or phosphonite,
f) the initial YI of the stabilized polymer of is below 0 and the YI after 5 passes is below 6,
g) the L value of the stabilized polymer after any of 1, 3 or 5 passes is above 74,
h) the whiteness index (CIE [D65/10]) after 5 passes is more than 20.

The stabilizer composition can generally be prepared according to any known mixing technique known to the skilled person. It can be prepared from solid or liquid compounds, by simple mix, grind, extrusion or melt processes which can include two or more of the constituents of the composition. It has, however, proven to be advantageous in a number of cases if the stabilizer is prepared by a method which ensures a thorough mixture of at least some of the constituents of the final stabilizing mixture. Especially a thorough mixing of components (a) and (b) may be advantageous in achieving a combination of the above mentioned superior results a) to h) and further results as specified throughout the specification. Thus, while a thorough mixing of the components can be achieved by many of the above mentioned mixing methods, some of these methods have proven to be especially advantageous for the provision of a stabilized polymer mixture according to the invention.

According to another embodiment of the present invention, a stabilized polymer composition is provided by a process comprising
(1) preparing a premixture comprising the antacid (a) and the organic acid-metal salt (b) or the antioxidant (c);
(2) intimately mixing the premixture obtained from step (1) at an elevated temperature sufficient to provide a softened or preferably molten mixture comprising a dispersion of the antacid (a) in the organic acid-metal salt (b) or the primary antioxidant (c);
(3) optionally, lowering a temperature of the molten mixture to provide a second premixture in solid form; and
(4) combining the molten premixture of step (2) or the premixture in solid form of step (3) with the polymer to be stabilized and the at least one additional ingredient of (b) or (c) or (d), if not already present.

According to another embodiment of the present invention, a stabilized polymer composition is provided, wherein a mixture of at least (a) and (b) of the stabilizer composition has been subjected to a temperature of more than 100° C. before admixture with the polymer to be stabilized.

According to another embodiment of the present invention, a method for preparing a stabilized polymer composition comprising the steps (a) to (d) is provided. The method comprises incorporating into the polymer an effective amount of a premixed stabilizer composition in an effective amount ranging from about 50 parts per million (ppm) to about 20,000 ppm or less, e.g., to about 10,000 ppm. The premixed stabilizer composition comprises: (a) about 1 wt % to about 90 wt % based on the total weight of the stabilizer composition of an antacid which does not fall under the compounds of (b), preferably selected from the group consisting of metal oxides, metal hydroxides, metal carbonates, metal bicarbonates, natural hydrotalcites, synthetic hydrotalcites, natural hydrocalumites, synthetic hydrocalumites, pyrocatecholates, zeolites, silicates, and combinations thereof; (b) about 10 wt % to about 99 wt % of an organic acid-metal salt having a general formula M1Ym, wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof; wherein Y is a conjugate base of an organic acid, having from six to twenty-four carbon atoms, selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, dicarboxylic acid, polyprotic carboxylic acids, and combinations thereof; and wherein m is an integer from 1 to 3; and (c) about 0 wt % to about 89 wt %, preferably of a primary antioxidant selected from the group consisting of a sterically hindered phenolic compound, a hindered amine compound, a hydroxylamine compound, and combinations thereof, and (d) 0 to 59 wt % based on the total weight of the stabilizer composition of a stabilizer containing a P-atom, especially of a stabilizer selected from the group comprising phosphites and phosphonites.

The premixed stabilizer composition is provided by a process comprising: (1) preparing a first premixture comprising the antacid and at least one of the organic acid-metal salt or the antioxidant or both; (2) mixing the first premixture obtained from step (1) at an elevated temperature sufficient to provide a molten mixture comprising a dispersion of the antacid in the organic acid-metal salt and/or the primary antioxidant; (3) optionally, lowering a temperature of the molten mixture to provide a second premixture in solid form; and (4) combining the molten mixture of step (2) or the second premixture in solid form of step (3), and the at least one additional component of the organic acid-metal salt and/or the primary antioxidant, if not already present, with the polymer to provide a stabilized polymer, According to another embodiment of the present invention, a method for decreasing a phosphite stabilizer (d) content necessary to stabilize a polymer is provided. The method comprises incorporating into the polymer an effective amount of a premixed stabilizer composition in an effective amount ranging from about 50 ppm to about 20,000 ppm or less, e.g., to about 10,000 ppm. The premixed stabilizer composition comprises: (a) about 1 wt % to about 90 wt % based on the total weight of the stabilizer composition of an antacid which does not fall under the compounds of (b), preferably selected from the group consisting of metal oxides, metal hydroxides, metal carbonates, metal bicarbonates, natural hydrotalcites, synthetic hydrotalcites, natural hydrocalumites, synthetic hydrocalumites, pyrocatecholates, zeolites, silicates, and combinations thereof; (b) about 10 wt % to about 99 wt % of an organic acid-metal salt having a general formula M1Ym, wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof; wherein Y is a conjugate base of an organic acid, having from six to twenty-four carbon atoms, selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, dicarboxylic acid, polyprotic carboxylic acids, and combinations thereof; and wherein m is an integer from 1 to 3; and (c) about 0 wt % to about 89 wt % of a primary antioxidant selected from the group consisting of a sterically hindered phenolic compound, a hindered amine compound, a hydroxylamine compound, and combinations thereof, and (d) 0 to 59 wt % based on the total weight of the stabilizer composition of a stabilizer containing a P-atom, especially of a stabilizer selected from the group comprising phosphites and phosphonites. The method provides for a reduction of the content in phosphites and phosphonites as compared to a stabilized polymer composition that achieves the same results with regard to one condition a) to h) or two or more conditions a) to h) with a stabilizer differing in amount of one or more of the constituents (a) to (c).

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF EMBODIMENTS OF THE INVENTION

Figure 1:
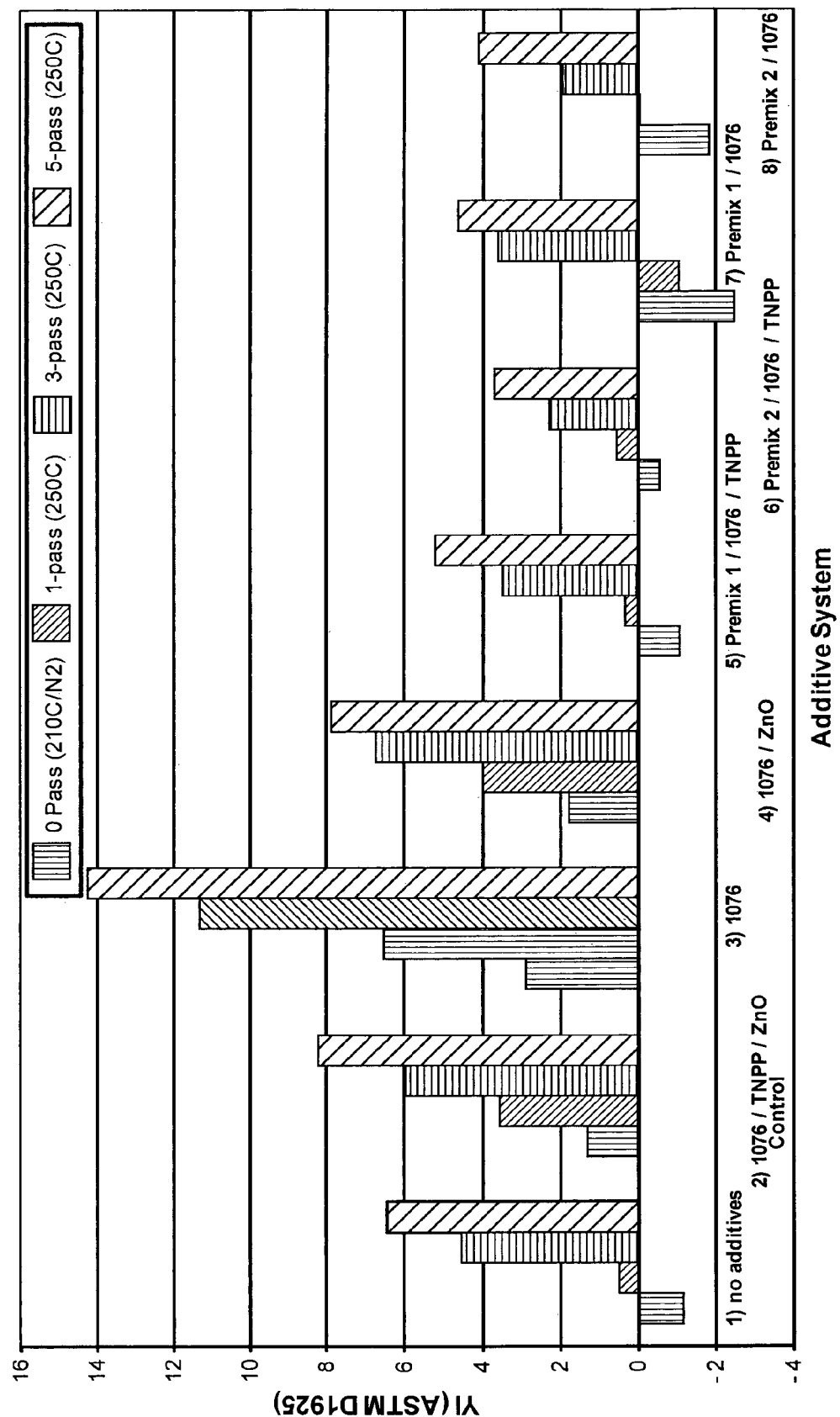
FIG. 1 is a bar graph showing a comparison of Yellowness Index (YI) results from a multi-pass extrusion study of unstabilized and stabilized linear low density polyethylene (LLDPE) compositions.

As used herein, the term "stabilizing" means improving the stability of a polymer composition during extrusion or polymer processing, or against exposure to severe conditions, and the like. Further, the term "stabilization" may also mean improving the stability of the polymer against changes in molecular weight, melt flow index, color degradation, e.g. in the yellowness index of the polymer during extrusion or similar polymer processing operations. In another embodiment, stabilization may mean to improve the stability of the polymer due to degradation upon exposure to weathering, heat, light, and/or the elements. The words "polymer," "copolymer," "terpolmer," and "polymer resin" are used interchangeably and refer to the same unless the context clearly dictates otherwise.

As used herein, a "stabilizing amount" is meant an amount effective to improve the polymer resin stabilization against, for example, molecular weight degradation, color degradation, or molecular weight degradation and color degradation from melt processing, from weathering, and/or from long term field exposure to heat, light, and/or the elements.

As used herein, "phosphorous based stabilizers" are stabilizers containing a P-atom, including organic phosphite compounds, organic phosphonite compounds, or other organic phosphorous compounds that provide stabilizing effects to polymers, especially selected from the group comprising phosphites and phosphonites.

As used herein, "decreasing a phosphorus based stabilizer content necessary to stabilize a polymer" is meant to identify that for a specified polymer for a specified intended use, there is an industry accepted level of phosphorus based stabilizer to achieve adequate stability, which can be measured by industry standard analytical methods that measure Melt Flow Rate (ASTM D1238 Test Method for Melt Flow Rates of Thermoplastics by Extrusion Plastometer) and Yellowness Index (ASTM D6290-13 Standard Test Method for Color Determination of Plastic Pellets). Thus, in accordance with an embodiment of the present invention, the decrease in the phosphorus based stabilizer content necessary to stabilize the polymer is greater than 15%. For example, the decrease in the phosphorus based stabilizer content necessary to stabilize the polymer is greater than about 20%, or greater than about 30%, or greater than about 50%, or greater than about 75%, or even eliminate the need for any phosphorus based stabilizer altogether.

Thus, in accordance with embodiments of the present invention, the decrease in the phosphorus based stabilizer content necessary to stabilize the polymer is provided by the premixed stabilizer compositions, as described herein, which is present in the stabilized polymer in an effective amount in a range from about 50 ppm to about 20,000 ppm or less, e.g., to about 10,000 ppm. The inventive premixed stabilizer compositions comprise (a) an antacid which does not fall under the compounds of (b); (b) an organic acid-metal salt having a general formula M1Ym, wherein M1, Y, and m are defined below; and (c) a primary antioxidant, such as a sterically-hindered phenolic compound, a sterically-hindered amine compound, or a hydroxylamine compound. The stabilizer compositions are prepared by a process wherein (a) the antacid and at least one of (b) the organic acid-metal salt or (c) the primary antioxidant are mixed at an elevated temperature sufficient to provide a molten mixture comprising a dispersion of the antacid in the organic acid-metal salt and/or the primary antioxidant.

In accordance with another embodiment of the present invention, a stabilized polymer composition is provided, comprising a polymer selected from the group consisting of a polyolefin polymer, a styrenic polymer, a poly(meth)acrylate polymer, and combinations thereof; and about 50 parts per million (ppm) to about 20,000 ppm or less, e.g., to about 10,000 ppm of the inventive premixed stabilizer composition, which further comprises (d) 0 to about 59 wt % based on the total weight of the stabilizer composition of a phosphorous based stabilizer. The weight ratio of the phosphorous based stabilizer to at least one of (a), (b) or (c) is 1 or less than 1, preferably less than 1, e.g., the weight ratio to one of (a), (b) or (c) which is present in the highest amount in comparison of (a), (b) or (c), or the weight ratio to one of (a), (b) or (c) which is present in the lowest amount in comparison of (a), (b) or (c). In some embodiments, (d) may be present in an amount that is less than 50 wt %, less than 40 wt %, less than 35 wt %, less than 20 wt %, or even less than 5 wt %, all based on the total weight of the stabilizer composition. In some embodiments, the stabilizer composition may even be substantially free of (d).

Advantageously, in one embodiment of the present invention, the stabilized polymer compositions may be further characterized by at least two of the following conditions under multi-pass extrusion:

a) a melt flow ratio (MFR) in g/10 min, 190° C., 10 kg, of the stabilized polymer after the fifth pass of a multi-pass extrusion is less than 10% higher than the MFR after the first pass or it is lower, wherein MFR is measured in accordance with ASTM D1238 standard test;

b) a yellowness index (YI) of the stabilized polymer after one pass is less than 0 and less than the YI of a neat sample of the polymer extruded under the same conditions in the absence of any stabilizer, wherein YI is measured in accordance with ASTM D6290-13 standard test;

c) the YI of the stabilized polymer after 1 pass is less than 1;

d) the YI of the stabilized polymer after 5 passes is less than 0;

e) an Oxidative Induction Time (OIT) of the stabilized polymer comprising the phosphorous based stabilizer that is higher than the OTI of a sample tested under the same conditions comprising more of the phosphorous based stabilizer, wherein the OTI is measured according to ASTM D 3895 (200° C., O2);

f) an initial YI of the stabilized polymer is below 0 and the YI after 5 passes is below 6;

g) an L value of the stabilized polymer after any of 1, 3 or 5 passes is above 74; or h) a Whiteness Index (CIE [D65/10]) after 5 passes is more than 20.

The L-value is the L-value of the CIE L*a*b colour space measured according to EN ISO 11664-4.

In accordance with another embodiment, the stabilized polymer composition is characterized in that at least three of the conditions a) to h) under multi pass extrusion of the stabilized polymer composition are met. In another embodiment, at least one of the features a) to h) remains identical or is improved when two samples are compared which only differ in their amount of phosphorus based stabilizer, where the improvement is found in the sample comprising less of the phosphorus based stabilizer, preferably at least 10% less.

According to an embodiment of the present invention, the initial YI of a stabilized HDPE composition is less than −4.

According to an embodiment of the present invention, the YI of a stabilized HDPE composition after one pass is less than −1.

According to an embodiment of the present invention, the YI of a stabilized HDPE composition after 5 passes is less than 3.

According to an embodiment of the present invention, the MFR of a stabilized HDPE composition after the fifth pass is lower than the MFR after the first pass.

According to an embodiment of the present invention, the YI of a stabilized polypropylene composition after 5 passes is less than −1.

According to an embodiment of the present invention, the YI of a stabilized LLDPE composition after one pass is less than −4.

According to an embodiment of the present invention, the YI of a stabilized LLDPE composition after 3 passes is less than 5.

According to an embodiment of the present invention, the YI of a stabilized LLDPE composition after 5 passes is less than 6.

According to an embodiment of the present invention, the YI of a stabilized LLDPE composition after a gas fade test (gas fume chamber, 55° C., 4 days) is less than 1.6.

According to an embodiment of the present invention, the Whiteness Index of a stabilized LLDPE composition is at least 27, and at least one of the following conditions is met: the YI after one pass is less than −4, the YI after 3 passes is less than 5, the YI after 5 passes is less than 6, the YI after a gas fade test (gas fume chamber, 55° C., 4 days) is less than 1.6.

Stabilizer Component(S):

(a) Antacid

Antacids according to the present invention are different from organic acid-metal salts according to component (b).

Exemplary antacids suitable for use in the stabilizer composition include, but are not limited to, metal oxides; metal hydroxides; metal carbonates; metal bicarbonates; natural or synthetic inorganic materials such as hydrotalcites, hydrocalumites, pyrocatecholates, zeolites, or silicates, or combinations thereof.

According to an embodiment, the antacid is an inorganic material having the general formula

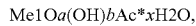

Me1O$a$(OH)$b$Ac*$x$H2O, wherein Me1 is a cation having a maximum valence charge of 4 selected from, but not limited to, Li, Na, K, Mg, Ca, Zr, Sn, Si, Ti, Al, Fe, as well as Zn, or a mixture thereof; wherein A represents an anion selected from, but not limited to, sulfate, sulfite, sulfide, thiosulfate, peroxide, peroxosulfate, hydrogen phosphate, hydrogen phosphite, carbonate, halogenide, nitrate, nitrite, hydrogen sulfate, hydrogen carbonate, hydrogen sulfite, hydrogen sulfide, dihydrogen phosphate, dihydrogen phosphite, monocarboxylic acids such as acetate and benzoate, amide, azide, hydroxide, hydroxyl amide, hydrazide, acetyl acetonate, phenolate, pseudohalogenides, halogenites, halogenates, perhalogenates, I3-, permanganate, dianions of dicarboxylic acids such as phthalate, oxalate, maleate, and fumarate, bisphenolate, phosphate, pyrophosphate, phosphite, pyrophosphite, trianions of tricarboxylic acid such as citrate, trisphenolate, and/or mixtures thereof; wherein a+b does not equal 0; wherein c is selected so that an electro-neutral molecule is formed; and wherein x represents the number of H2O molecules present, if applicable.

For example, the antacid used in the stabilizer composition can include a metal oxide such as zinc oxide, calcium oxide, magnesium oxide, or combinations thereof; or a metal hydroxide such as calcium hydroxide, magnesium hydroxide, or combinations thereof.

Preferably, the antacid used in the stabilizer composition comprises at least one metal oxide.

According to embodiments of the present invention, the antacid is included in the stabilizer composition in an amount in a range from about 1 wt % to about 60 wt % based on the total weight of the stabilizer composition. For example, the stabilizer composition may include about 2 wt % to about 50 wt %, about 5 wt % to about 40 wt %, or about 10 wt % to about 30 wt % of the antacid.

(b) Organic Acid-Metal Salt

Exemplary organic acid-metal salts suitable for use in the stabilizer composition include, but are not limited to, those metal salts having a general formula M1Ym, wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof; wherein Y is a conjugate base of an organic acid, having from six (6) to twenty-four (24) carbon atoms, said organic acid being selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, a dicarboxylic acid, or a polyprotic carboxylic acid, and combinations thereof; and wherein m is an integer from 1 to 3.

For example, the organic acid-metal salt used in the stabilizer composition can include the metal salt of an organic acid selected from, but not limited to, hexanoic acid; octanoic acid; 2-ethylhexanoic acid; decanoic acid; decenoic acid; lauric acid; cis-9-dodecenoic acid; myristic acid; cis-9-tetradecenoic acid; pentadecanoic acid; cis-9-pentadecenoic acid; palmitic acid; cis-9-hexadecenoic acid; hexadecadienoic acid; heptadecanoic acid; heptadecenoic acid; stearic acid; 12-hydroxystearic acid; oleic acid; linoleic acid; linolenic acid; octadecatetraenoic acid; α-eleosteric acid; 4-oxo-cis-9, trans-11, trans-13-octadecatrienoic acid; ricinoleic acid; dihydroxystearic acid; nonadecanoic acid; ecosanoic acid; cis-9-eicosenoic acid; cis-11-eicosenoic acid; eicosadienoic acid; eicosatrienoic acid; arachidonic acid; eicosapentaenoic acid; docosanoic acid; cis-13-docosenoic acid; docosatetraenoic acid; 4,8,12,15,19-docosapentaenoic acid; docosahexanoic acid; tetracosanoic acid; tetracosenoic acid; 4,8,12,15,18,21-tetracosahexaenoic acid; malonic acid; succinic acid; glutaric acid; adipic acid; pimelic acid; suberic acid; azelaic acid; sebacic acid; maleic acid; fumaric acid; phthalic acid; isophtalic acid; terephthalic acid; or combinations thereof.

The organic acid-metal salts may be used in a previously prepared form or can be prepared in-situ. Various processes are amenable to the production of the organic acid-metal salt. For example, suitable processes include, but not limited to, precipitation and fusion processes, both of which are well known by those skilled in the art.

According to embodiments of the present invention, the organic acid-metal salt is included in the stabilizer composition in an amount in a range from about 10 wt % to about 69 wt % based on the total weight of the stabilizer composition. For example, the stabilizer composition may include about 12 wt % to about 65 wt %, about 15 wt % to about 60 wt %, about 20 wt % to about 50 wt %, or about 30 wt % to about 40 wt % of the organic acid-metal salt.

According to a preferred embodiment of the present invention, antacid (a) comprises at least one of zinc oxide, calcium oxide, magnesium oxide, calcium hydroxide, or magnesium hydroxide, and the organic acid-metal salt (b) comprises zinc stearate or magnesium stearate.

(c) Primary Antioxidant

According to embodiments of the present invention, the primary antioxidant included in the stabilizer composition is at least one of a sterically-hindered phenolic compound, a sterically-hindered amine compound, or a hydroxylamine compound, or combinations thereof.

Exemplary sterically-hindered phenolic compounds suitable for use in the stabilizer composition include, but are not limited to, alkylated mono-phenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-di-octadecyl-4-methylphenol, 2,4,6,-tricyclohexyphenol, 2,6-di-tert-butyl-4-methoxymethylphenol, and the like; alkylated hydroquinones, such as 2,6-di-tert-butyl-4-methoxyphenol, 2,5-di-tert-butylhydroquinone, 2,5-di-tert-amyl-hydroquinone, 2,6-diphenyl-4-octadecyloxyphenol, and the like; hydroxylated thiodiphenyl ethers, such as 2,2'-thio-bis-(6-tert-butyl-4-methylphenol), 2,2'-thio-bis-(4-octylphenol), 4,4'-thio-bis-(6-tertbutyl-3-methylphenol), and 4,4'-thio-bis-(6-tert-butyl-2-methylphenol); alkylidene-bisphenols, such as 2,2'-methylene-bis-(6-tert-butyl-4-methylphenol), 2,2'-methylene-bis-(6-tert-butyl-4-ethylphenol), 2,2'-methylene-bis-(4-methyl-6-(α-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methyl-phenol), 2,2'-methylene-bis-(6(α-methylbenzyl)-4-nonylphenol), 2,2'-methylene-bis-(6-(α,α- dimethylbenzyl)-4-nonyl-phenol). 2,-2'-methylene-bis-(4,6-di-tert-butylphenol), 2,2'-ethylidene-bis-(6-tert-butyl-4-isobutylphenol), 4,4'-methylene-bis-(2,6-di-tert-butylphenol), 4,4'-methylene-bis-(6-tert-butyl-2-methylphenol), 1,1-bis-(5-tert-butyl-4-hydroxy-2-methylphenol)butane 2,6-di-(3-tert-butyl-5-methyl-2-hydroxybenzyl)-4-methylphenol, 1,1,3-tris-(5-tert-butyl-4-hydroxy-2-methylphenyl)butane, 1,1-bis-(5-tert-butyl-4-hydroxy-2-methylphenyl)-3-dodecyl-mercaptobutane, ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene, di-(2-(3'-tert-butyl-2'hydroxy-5'methylbenzyl)-6-tert-butyl-4-methylphenyl)terephthalate; and other phenolics such as monoacrylate esters of bisphenols such as ethylidiene bis-2,4-di-tertbutylphenol monoacrylate ester and esters of 3,5-di-butyl hydroxyphenyl propionic acid.

Other exemplary phenolic antioxidants n-octadecyl, 3,5-di-tert-butyl-4-hydroxyhydrocinnamate; neopentanetetrayl, tetrakis(3,5-di-tert-butyl-4-hydroxyhydro-cinnamate); tetrakis[methylene(3,5-di-tert-butyl-4-hydroxyhydrocinnamate) methane]; di-n-octadecyl-3,5-di-tert-butyl-4-hydroxybenzylphosphonate; 1,3,5-tris(3,5-di-tert-butyl-4-hydroxybenzyl)-isocyanurate, thio diethylene bis(3,5-di-tert-butyl-4-hydroxyhydro cinnamate); 1,3,5-trimethyl-2,4,6-tris(3,5-di-tert-butyl-4-hydroxybenzyl)-benzene; 3,6-dioxaoctamethylene bis(3-methyl-5-tert-butyl-4-hydroxyhydro-cinnamate); 2,6-di-tert-butyl-p-cresol; 2,2'-ethylidene-bis(4,6-di-tert-butylphenol); 1,3,5-tris(2,6-dimethyl-4-tert-butyl-3-hydroxybenzyl)isocyanurate; 1,1,3-tris(2-methyl-4-hydroxy-5-tert-butylphenyl)butane; 1,3,5-tris[2-(3,5-di-tert-butyl-4-hydroxyhydro-cinnamoyloxy)ethyl]isocyanurate; 3,5-di-(3,5-di-tert-butyl-4-hydroxybenzyl)mesitol; hexamethylene bis(3,5-di-tert-butyl-4-hyroxyhydrocinnamate); 1-(3,5-di-tert-butyl-4-hydroxyanilino)-3,5-di(octylthio)-s-triazine; N,N'-hexamethylene-bis(3,5-di-tert-butyl-4-hydroxyhydrocinnamamide); calcium bis(ethyl-3,5-di-tert-butyl-4-hydroxybenzyl-phosphonate); ethylene bis[3,3-di(3-tert-butyl-4-hydroxyphenyl)butyrate]; octyl-3,5-di-tert-butyl-4-hydroxybenzylmercaptoacetate; bis(3,5-di-tert-butyl-4-hydroxyhydro-cinnamoyl) hydrazide; N,N'-bis-[2-(3,5-di-tert-butyl-4-hydroxyhydrocinnamoyloxy)-ethyl]-oxamide; octadecyl-3,5-di-tert-butyl-4-hydroxycinnamate; tetrakis[methylene-(3,5-di-tert-butyl-4-hydroxyhydrocinnamate)]methane; 1,3,5-tris(3,5-di-tert-butyl-4-hydroxybenzyl)isocyanurate; tetrakis(3,5-di-tert-butyl-4-hydroxyhydrocinnamate); and/or combinations thereof.

Exemplary sterically-hindered amine compounds include, but are not limited to, bis(2,2,6,6-tetramethyl-4-piperidyl)sebacate; bis(2,2,6,6-tetramethyl-4-piperidyl)succinate; bis(1,2,2,6,6-pentamethyl-4-piperidyl)sebacate; bis(1-octyloxy-2,2,6,6-tetramethyl-4-piperidyl)sebacate; bis(1,2,2,6,6-pentamethyl-4-piperidyl)n-butyl-3,5-di-tert-butyl-4-hydroxybenzylmalonate; the condensate of 1-(2-hydroxyethyl)-2,2,6,6-tetramethyl-4-hydroxypiperidine and succinic acid; linear or cyclic condensates of N,N'-bis(2,2,6,6-tetramethyl-4-piperidyl)hexamethylenediamine and 4-tert-octylamino-2,6-dichloro-1,3,5-triazine; tris(2,2,6,6-tetramethyl-4-piperidyl-)nitrilotriacetate; tetrakis(2,2,6,6-tetramethyl-4-piperidyl)-1,2,3,4-butanetetra-carboxylate; 1,1'-(1,2-ethanediyl)-bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione; bis(1-octyloxy-2,2,6,6-tetramethylpiperidyl)sebacate; bis(1-octyloxy-2,2,6,6-tetramethyl-piperidyl)succinate, linear or cyclic condensates of N,N'-bis(2,2,6,6-tetramethyl-4-piperidyl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-di-(4-n-butylamino-1,2,2,6,6-pentamethylpiperidyl)-1,3,5-triazine and 1,2-bis(3-aminopropylamino)ethane; 8-acetyl-3-dodecyl-7,7,9,9-tetramethyl-1,3,8-triazaspiro-[4.5]decane-2,4-dione; 3-dodecyl-1-(2,2,6,6-tetramethyl-4-piperidyl)pyrrolidine-2,5-dione; 3-dodecyl-1-(1,2,2,6,6-pentamethyl-4-piperidyl)pyrrolidine-2,5-dione; a mixture of 4-hexadecyloxy- and 4-stearyloxy-2,2,6,6-tetramethylpiperidine; a condensate of N,N'-bis(2,2,6,6-tetramethyl-4-piperidyl)hexamethylenediamine and 4-cyclo hexylamino-2,6-dichloro-1,3,5-triazine; a condensate of 1,2-bis(3-aminopropyl-amino)ethane, 2,4,6-trichloro-1,3,5-triazine and 4-butylamino-2,2,6,6-tetramethylpiperidine (CAS Reg. No. [136504-96-6]); a condensate of 1,6-hexanediamine, 2,4,6-trichloro-1,3,5-triazine, N,N-dibutylamine and 4-butylamino-2,2,6,6-tetramethylpiperidine; N-(2,2,6,6-tetramethyl-4-piperidyl)-n-dodecyl-succinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5] decane; a reaction product of 7,7,9,9-tetramethyl-2-cycloundecyl-1-oxa-3,8-diaza-4-oxospiro-[4,5]decane and epichlorohydrin; 1,1-bis(1,2,2,6,6-pentamethyl-4-piperidyloxycarbonyl)-2-(4-methoxy-phenyl)-ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane; a reaction product of maleic acid anhydride-α-olefin copolymer with 2,2,6,6-tetramethyl-4-aminopiperidine or 1,2,2,6,6-pentamethyl-4-aminopiperidine; 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine; 5-(2-ethylhexanoyl)oxymethyl-3,3,5-trimethyl-2-morpholinone; 5-(2-ethylhexanoyl)oxymethyl-3,3,5-trimethyl-2-morpholinone; the reaction product of 2,4-bis[(1-cyclohexyloxy-2,2,6,6-piperidine-4-yl)butylamino]-6-chloro-s-triazine with N,N'-bis(3-aminopropyl)ethylenediamine); 1,3,5-tris(N-cyclohexyl-N-(2,2,6,6-tetramethylpiperazine-3-one-4-yl)amino)-s-triazine and 1,3,5-tris(N-cyclohexyl-N-(1,2,2,6,6-pentamethylpiperazine-3-one-4-yl)amino)-s-triazine; or combinations thereof. Amine oxides of hindered amine stabilizers are also included in the present invention.

Exemplary hydroxylamine compounds include, but are not limited to, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxyl-amine, N,N-dioctadecylhydroxylamine, N-hexadecyl-N-octadecylhydroxylamine, N-heptadecyl-N-octadecylhydroxylamine, N,N-dialkylhydroxylamine, N,N-di-tert-butylhydroxylamine, N-cyclohexylhydroxylamine, N-cyclododecylhydroxylamine, N,N-dicyclohexylhydroxylamine, N,N-dibenzylhydroxylamine, N,N-didecylhydroxyl-amine, N,N-di(coco alkyl)hydroxylamine, N,N-di (C20-C22 alkyl) hydroxylamine, and N,N-dialkylhydroxylamine derived from hydrogenated tallow amine (that is, N,N-di(tallow alkyl)hydroxylamine; as well as mixtures containing any of the foregoing.

According to a preferred embodiment of the present invention, the primary antioxidant is a phenolic antioxidant.

According to embodiments of the present invention, the primary antioxidant is included in the stabilizer composition in an amount in a range from about 30 wt % to about 89 wt % based on the total weight of the stabilizer composition. For example, the stabilizer composition may include about 35 wt % to about 85 wt %, about 40 wt % to about 80 wt %, about 45 wt % to about 75 wt %, or about 50 wt % to about 70 wt % of the primary antioxidant.

(d) Stabilizer Containing a P-Atom

According to the present invention, the stabilize composition may comprise a stabilizer containing a P-atom. Stabilizers containing a P-atom include organic phosphite compounds, organic phosphonite compounds, other organic phosphorous compounds that provide stabilizing effects to polymers. Stabilizer containing a P-atom may especially be selected from the group comprising phosphites and phosphonites.

The stabilizer composition may comprise 0 to about 59 wt % of the phosphorus based stabilizers, based on the total weight of the stabilizer composition. The weight ratio of the phosphorous based stabilizer to at least one of (a), (b) or (c) is 1 or less than 1, preferably less than 1. For example, the weight ratio of the phosphorus based stabilizer to the antacid (a) may be 1:1, or about 1:2, or about 1:4. For example, the weight ratio of the phosphorus based stabilizer to the organic acid-metal salt (b) may be 1:1, or about 1:2, or about 1:4. For example, the weight ratio of the phosphorus based stabilizer to the primary oxidant (c) may be 1:1, or about 1:2, or about 1:4. According to another embodiment, the stabilizer composition may comprise about 1 to about 35 wt % of the phosphorus based stabilizers based on the total weight of the stabilizer composition.

However, according to another embodiment, the stabilizer composition is substantially free of any phosphorus based stabilizers. As used herein, "substantially free" means that no phosphorus based stabilizers is intentionally added to the stabilizer composition.

Due to the stabilizing effect provided by the premixed stabilizer composition of the present invention, the phosphorus based stabilizer content necessary to stabilize a polymer is decreased. In one embodiment, the decrease in the phosphorus based stabilizer content necessary to stabilize the polymer is greater than 15%, which is based on measurements of Melt Flow Rate (ASTM D1238 Test Method for Melt Flow Rates of Thermoplastics by Extrusion Plastometer). In another embodiment, the decrease in the phosphorus based stabilizer content necessary to stabilize the polymer is greater than 15%, which is based on measurements of Yellowness Index (ASTM D6290-13 Standard Test Method for Color Determination of Plastic Pellets). Additionally, the decrease in the phosphorus based stabilizer content necessary to stabilize the polymer may be greater than about 20%, or greater than about 30%, or greater than about 50%, or greater than about 75%, or even eliminate the need for any phosphorus based stabilizer altogether.

(e) Additional Components

According to embodiments of the present invention, the stabilizer composition may further include one or more additional components such as secondary antioxidant compounds, UV absorbers, light stabilizers, metal deactivators, peroxide scavengers, fillers and reinforcing agents, plasticizers, epoxidized vegetable oils, such as epoxidized soybean oils, lubricants like stearyl alcohol, emulsifiers, pigments, optical brighteners, flameproofing agents, anti-static agents, blowing agents, antiblocking agents, clarifiers, antiozonants, optical brighteners, flameproofing agents, and thio-synergists such as dilaurythiodipropionate, distearylthiodipropionate, neopentanetetrayl, tetrakis(3-dodecylthioproprionate). The additional components, when present, are used in an amount effective to further improve the stabilizing ability of the stabilizer composition or to improve the utility of the polymer composition or both.

According to an embodiment, a secondary antioxidant compound may be included in the premixed stabilizer composition. Exemplary secondary antioxidants, but are not limited to, phosphorus based stabilizers such as an organic phosphite compound and/or an organic phosphonite compound, or an acylaminophenol compound.

Exemplary organic phosphite and phosphonite compounds include, but are not limited to, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl-3,5-di-tert-butyl-4-hydroxy-benzyl-mercaptoacetate; bis-(4-tert-butyl-3-hydroxy-2,6-dimethylbenzyl)dithiol-terephthalate; 1,3,5-tris-(3,5-di-tert-butyl-4,10-hydroxybenzyl)isocyanurate; 1,3,5-tris-(4-tert-butyl-3-hydroxy-2,6-dimethylbenzypiso-cyanurate; dioctadecyl-3,5-di-tert-butyl-4-hydroxybenzyl-phosphonate; calcium salt of monoethyl-3,5-di-tertbutyl-4-hydroxybenzylphosphonate; and 1,3,5-tris-(3,5-dicyclohexyl-4-hydroxybenzyl)-isocyanurate.

Acylaminophenols may be used as a secondary antioxidant, such as for example, 4-hydroxylauric acid anilide, 4-hydroxystearic acid anilide, 2,4-bis-octylmercapto-6-(3,5-tert-butyl-4-hydroxyanilino)-s-triazine, and octyl-N-(3,5-di-tert-butyl-4-hydroxyphenyl)-carbamate.

Premixed Stabilizer Composition Preparation

In accordance with embodiments of the present invention, the stabilizer compositions may be prepared by combining components (a)-(c), and optionally (d), in a variety of suitable ways. According to an embodiment of the present invention, the antacid (a) and the organic acid-metal salt (b) are combined to form a premixture, prior to combining with the primary antioxidant (c). For example, in accordance with an embodiment, a premixture of (a) about 1 wt % to about 60 wt % of the antacid; and (b) about 10 wt % to about 69 wt % of the organic acid-metal salt can be prepared, followed by combining the premixture with (c) about 30 wt % to about 89 wt % of the primary antioxidant, wherein wt % is based on the total weight of (a)-(c). The premixture of (a) and (b) can be prepared by a melt mix or a fusion process, as described above.

Various processes are amenable to the production of the antacid and organic acid-metal salt premixture. For example, suitable processes include, but not limited to, melt and fusion processes.

For example, a low melting organic acid-metal salt can be heated to or above its melting point and then the antacid mixed into the molten organic acid-metal salt to form the premixture. Accordingly, the premixture of antacid and organic acid-metal salt can be prepared by melting the desired organic acid-metal salt followed by intimate mixing of the desired quantity of antacid into the organic acid-metal salt melt.

According to another example, the premixture of antacid and organic acid-metal salt can be prepared by reacting the appropriate organic acid with a required stoichiometric excess of one or more antacids. The required stoichiometric excess is based on the desired or necessary quantity of antacid present in the premixed stabilizer composition. In this process, the fusion process is performed at a temperature that is at or above the melting point of the organic acid-metal salt fusion reaction product. This fusion process may optionally employ a catalyst to accelerate the reaction and reduce the induction temperature of the reaction. Catalysts for this fusion process are known to those skilled in the art. For example, diprotic and triprotic acids are suitable catalysts. An exemplary fusion process would be reacting the organic acid with zinc oxide, magnesium oxide, or calcium oxide in the presence of adipic acid, citric acid, and/or succinic acid, which form the desired organic acid-metal salt in-situ.

Advantageously, the fusion process reaction can be controlled at temperatures above the melting point of the organic acid-metal salt and below the degradation temperature of the product organic acid-metal salt. For example, in one embodiment using zinc stearate wherein the carboxylic acid is derived from natural sources such as tallow or vegetable oil, it is important to stay below 200° C., which is its decomposition temperature. State-of-the-art fusion processes have advantages of yielding a physical form of the premixture that is relatively non-dusting and does not require additional steps to classify the material, require separate grinding steps, use inefficient batch processing techniques, or have long inefficient reaction times over 20 minutes. Specifically for fusion-produced premixtures, the state-of-the-art process using tightly controlled stoichiometry, process temperature controls, very short heat history (e.g., less than 20 minutes) at elevated temperatures above 80° C., and continuous forming process are desired. In one embodiment, the elevated temperature is greater than 140° C. and less than 200° C. An exemplary fusion-type process is described in U.S. Pat. No. 5,164,523, which is incorporated herein by reference in its entirety.

In accordance with another embodiment, a premixture of (a) about 1 wt % to about 60 wt % of the antacid; and (c) about 30 wt % to about 89 wt % of the primary antioxidant can be prepared, followed by combining the premixture of (a) and (c) with (b) about 10 wt % to about 69 wt % of the organic acid-metal salt based on the total weight of the stabilizer composition. Various processes are amenable to the production of the antacid and the antioxidant premixture. For example, the premixture of (a) and (c) can be prepared by a melt mix, similar to that described above. When utilized, the phosphorous based stabilizer may be included into a premix, or admixed into the polymer.

Thus, according to an embodiment of the present invention, a first molten premixture of the stabilizer composition is provided by a process comprising the following steps: (1) preparing a premixture comprising the antacid (a) and the organic acid-metal salt (b) or the antioxidant (c); and (2) intimately mixing the premixture obtained from step (1) at an elevated temperature sufficient to provide a molten mixture comprising a dispersion of the antacid (a) in the organic acid-metal salt (b) or the primary antioxidant (c).

According to another embodiment of the present invention, a second solid premixture of the stabilizer composition is provided by a process comprising the following steps: (1) preparing a premixture comprising the antacid (a) and the organic acid-metal salt (b) or the antioxidant (c); (2) intimately mixing the premixture obtained from step (1) at an elevated temperature sufficient to provide a molten mixture comprising a dispersion of the antacid (a) in the organic acid-metal salt (b) or the primary antioxidant (c), and (3) lowering a temperature of the molten mixture to provide a second premixture in solid form.

According to a preferred embodiment, the first premixture comprises the antacid (a) and the organic acid-metal salt (b), which provides the molten mixture comprising a dispersion of the antacid in the organic acid-metal salt.

According to a preferred embodiment, step (3) of the method includes lowering the temperature of the molten mixture to provide the second premixture in solid form comprising a dispersion of the antacid (a) in the organic acid-metal salt (b).

According to a preferred embodiment, the first premixture comprises the antacid (a) and the primary antioxidant (c), which provides the molten mixture comprising a dispersion of the antacid in the primary antioxidant.

According to a preferred embodiment, step (3) of the method includes lowering the temperature of the molten mixture to provide the second premixture in solid form comprising a dispersion of the antacid in the primary antioxidant.

The stabilizer compositions may be packaged along with a carrier material to improve or enhance the dispersion of the stabilizer composition throughout the polymer composition. Exemplary carriers include, but are not limited to, a polymer, an oligomer, a wax, an oil, a paraffin, an aliphatic ester, an aromatic ester, an aliphatic carboxylic acid, an aromatic carboxylic acid, a glycol, an alcohol, or combinations thereof. The selection of the carrier can be primarily based on its compatibility with the polymer to which it is to be added, as well as the intended manner of addition.

The stabilizer combinations may be incorporated into the polymer resins by conventional techniques, at any convenient stage prior to the manufacture of shaped articles therefrom. In one embodiment, the stabilizer composition is added in an amount of about 50 parts per million (ppm) to about 20,000 ppm or less, e.g., to about 10,000 ppm, based on the weight of the resin. For example, the stabilizer composition may present in the stabilized polymer composition in an amount of about 500 ppm to about 8,000 ppm, or from about 1,000 ppm to about 5,000 ppm. When present, the phosphorus based stabilizer (e.g., an organic phosphite compound and/or the organic phosphonite compound) may be present in the stabilized polymer resins in an amount from about 1 ppm to about 5,900 ppm. Advantageously, in accordance with another embodiment, the stabilized polymer composition is substantially free of any phosphorus based stabilizer.

Polymer Component

The polymer component may be any non-halogen-containing polymer known in the art, such as polyolefin, styrenic polymers, poly(meth)acrylate polymers, and combinations thereof.

In one embodiment, the polymer comprises a polyolefin polymer. Non-limiting examples of polyolefin polymers include, but are not limited to, polypropylene, polyisobutylene, polybut-1-ene, poly-4-methylpent-1-ene, polyisoprene, polybutadiene, cyclopentene, norbornene, polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polypropylene (VLDPE), ultra low density polyethylene (ULDPE), mixture of polypropylene with polyisobutylene, mixtures of polypropylene with polyethylene, ethylene/propylene copolymers, linear low density polyethylene (LLDPE) and mixtures of linear low density polyethylene with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers, polypropylene/ethylene-propylene copolymers, LDPE/ethylene-vinyl acetate copolymers (EVA), LDPE/ethylene-acrylic acid copolymers (EAA), LLDPE/EVA, LLDPE/EAA, ethylene-propylene-diene monomer copolymers (EPDM), copolymers of ethylene with higher alpha-olefins, polybutadiene, polyisoprene, styrene-butadiene copolymers, hydrogenated styrene-butadiene copolymers, styrene-isoprene copolymers, hydrogenated styrene-isoprene copolymers, and combinations thereof.

In a preferred embodiment, the polymer is a HDPE.
In a preferred embodiment, the polymer is a LLDPE.
In a preferred embodiment, the polymer is polypropylene.
In an embodiment, the stabilized polymer includes a styrenic polymer. Non-limiting examples of styrenic polymers include polystyrene (PS), acrylonitrile butadiene styrene (ABS) copolymer, or styrene acrylonitrile (SAN) copolymer.

In an embodiment, the stabilized polymer includes a poly(meth)acrylate polymer, which includes a polyacrylate polymer, a polymethacrylate polymer, or a copolymer of an acrylate monomer and a methacrylate monomer.

Processing Methods

The premixed stabilizer compositions of this invention help with the stabilization of polymer resin compositions especially in high temperature processing against changes in melt index and/or color, even though the polymer resin may undergo a number of extrusions. In other words, stabilized polymers comprising the premixed stabilizer composition show significantly improved color of the polymer and stabilization of the polymer architecture throughout heat and shear. The stabilizer compositions of the present invention may readily be incorporated into the polymer resin compositions by conventional techniques, at any convenient stage prior to the manufacture of shaped articles therefrom. For example, the stabilizer composition may be mixed with the resin in dry powder form, or a suspension or emulsion of the stabilizer composition may be mixed with a solution, suspension, or emulsion of the polymer.

The stabilized polymer resin compositions of the present invention can be prepared by a variety of methods, e.g., intimate admixing of the ingredients with any additional materials desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment.

All of the ingredients may be added initially to the processing system, or else certain additives may be pre-compounded with each other or with a portion of the polymer resin to make a stabilizer concentrate. Those of ordinary skill in the art will be able to adjust blending times and temperatures, as well as component addition location and sequence, without undue additional experimentation. While the stabilizers of this invention may be conveniently incorporated by conventional techniques into polymer resins before the fabrication thereof into shaped articles, it is also possible to apply the instant stabilizers by a topical application to the finished articles.

Thus, according to an embodiment of the present invention, a stabilized polymer composition according to the present invention is provided by (1) preparing a premixture comprising the antacid (a) and the organic acid-metal salt (b) or the antioxidant (c); (2) intimately mixing the premixture obtained from step (1) at an elevated temperature sufficient to provide a softened or preferably molten mixture comprising a dispersion of the antacid (a) in the organic acid-metal salt (b) or the primary antioxidant (c); (3) optionally, lowering a temperature of the molten mixture to provide a second premixture in solid form; and (4) combining the molten premixture of step (2) or the premixture in solid form of step (3) with the polymer and the at least one additional ingredient of (b) or (c) or (d), if not already present.

According to a preferred embodiment, the second premixture in solid form and the primary antioxidant (c) is mixed with the polymer.

According to a preferred embodiment, the second premixture in solid form and the organic acid-metal salt (b) is mixed with the polymer.

In another embodiment of the present invention, a mixture of the stabilizer components (a), (b), optionally (c), and optionally (d) is subjected to an elevated temperature before admixture with the polymer to be stabilized. Preferably, the mixture is subjected to a temperature of more than 100° C., for example to a temperature of from about 100° C. to about 200° C., from about 110° C. to about 170° C., or from about 120° C. to about 150° C. before admixture with polymer to be stabilized.

Thus, according to another embodiment of the present invention, a mixture of at least (a) and (b) has been subjected to a temperature of more than 100° C. before admixture with the polymer to be stabilized.

The present invention further relates to a method to decrease a phosphite stabilizer (d) content necessary to stabilize a polymer. The method comprises incorporating into the polymer an effective amount of a premixed stabilizer composition in an effective amount ranging from about 50 ppm to about 20,000 ppm or less, e.g., to about 10,000 ppm, by (1) preparing a premixture comprising the antacid (a) and the organic acid-metal salt (b) or the antioxidant (c); (2) intimately mixing the premixture obtained from step (1) at an elevated temperature sufficient to provide a softened or preferably molten mixture comprising a dispersion of the antacid (a) in the organic acid-metal salt (b) or the primary antioxidant (c); (3) optionally, lowering a temperature of the molten mixture to provide a second premixture in solid form; and (4) combining the molten premixture of step (2) or the premixture in solid form of step (3) with the polymer and the at least one additional ingredient of (b) or (c) or (d), if not already present. The premixed stabilizer composition comprises (a) about 1 wt % to about 60 wt % based on the total weight of the stabilizer composition of an antacid which does not fall under the compounds of (b), preferably selected from the group consisting of metal oxides, metal hydroxides, metal carbonates, metal bicarbonates, natural hydrotalcites, synthetic hydrotalcites, natural hydrocalumites, synthetic hydrocalumites, pyrocatecholates, zeolites, silicates, and combinations thereof; (b) about 10 wt % to about 69 wt % based on the total weight of the stabilizer composition of an organic acid-metal salt having a general formula M1Ym, wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof; wherein Y is a conjugate base of an organic acid, having from six to twenty-four carbon atoms, selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, dicarboxylic acid, polyprotic carboxylic acids, and combinations thereof; and wherein m is an integer from 1 to 3; (c) about 30 wt % to about 89 wt % based on the total weight of the stabilizer composition of a primary antioxidant selected from the group consisting of a sterically hindered phenolic compound, a hindered amine compound, a hydroxylamine compound, and combinations thereof; and (d) 0 to 59 wt % based on the total weight of the stabilizer composition of a stabilizer containing a P-atom, especially of a stabilizer selected from the group comprising phosphites and phosphonites, According to a preferred embodiment, the decrease in the stabilizer (d) content necessary to stabilize the polymer is greater than 15%, which is determined relative to a baseline measurement of Melt Flow Rate (ASTM D 1238 Test Method for Melt Flow Rates of Thermoplastics by Extrusion Plastometer), Yellowness Index (ASTM D 6290-13 Standard Test Method for Color Determination of Plastic Pellets) of a phosphorous based stabilizer package that is void of the premixed stabilizer composition, or both.

EXAMPLES

The following examples are included to provide additional guidance to those skilled in the art in practicing the claimed invention.

Methods

Yellowness Index (YI): The YI is a number calculated from spectrophotometric data that describes the change in color of a test sample from clear or white toward yellow. The YI is determined according to ASTM D6290-13.

Melt Flow Rate (MFR): The method for determining the rate of extrusion of the molten polymers is the standard method according to ASTM D1238 (g/10 min, 190° C., 10 kg) using an extrusion plastometer.

Oxidative-Induction Time (OIT): The method for determining the oxidative-induction time of polyolefins by differential scanning calorimetry (DSC) is the standard method according to ASTM D3895 (200° C., O2).

Gas Fade Test: The YI is determined after subjecting the sample to NOx gas for 4 days in a SDL Atlas model M291 Gas Fume Chamber at 55° C.

Whiteness Index: For the Whiteness Index, the CIE whiteness is determined using CIE illuminant D65 with a 10° observer (outdoor daylight). The method is standardized in ISO/CD 11475.

Example 1

Production of the premixture of (a) antacid and (b) organic acid-metal salt for the examples provided in Tables 1 and 2 are described below. The components for the production of the premixture according to embodiments of the present invention are presented in their order of addition.

Premix 1 was prepared by dispersing 135.4 g of zinc oxide (French Process with a purity of >99.7%) in 892.1 g of fatty acid (acid value 209) in a Parr Reactor, adding and dissolving 0.3 g of adipic acid catalyst in the reaction mixture, heating the reaction mixture to the induction temperature of the reaction and mixing and reacting the mixture under pressure of 35 psig for 20 minutes, venting the reaction vessel to atmospheric pressure while maintaining the temperature above the melting point of the resultant organic acid metal salt reaction product and finally 250 g of zinc oxide (French Process with a purity of >99.7%) was intimately mixed at 130° C.-150° C. to produce the premixture stabilizing component. The molten dispersion of the premixture was flaked to convert it to a solid form and coarsely milled for the experiments containing Premix 1 tabulated in Tables 1-3 below.

Premix 2 was prepared by dispersing 135.4 g of zinc oxide (French Process with a purity of >99.7%) in 892.1 g of fatty acid (acid value 209) in a Parr Reactor, adding and dissolving 0.3 g of adipic acid catalyst in the reaction mixture, heating the reaction mixture to the induction temperature of the reaction and mixing and reacting the mixture under pressure of 35 psig for 20 minutes, venting the reaction vessel to atmospheric pressure while maintaining the temperature above the melting point of the resultant organic acid metal salt reaction product and finally 250 g of magnesium oxide (synthetic with high purity >97.0%) was intimately mixed at 130° C.-150° C. to produce the premixture stabilizing component. The molten dispersion of the premixture was flaked to convert it to a solid form and coarsely milled for the experiments containing Premix 2 tabulated in Tables 1-3 below.

Premix 3 was prepared in accordance with the procedure described for Premixes 1 and 2 using 135.4 g of zinc oxide, in 892.1 g of fatty acid (acid value 209), and 250 g of calcium oxide.

Premix 4 was prepared by dispersing 299.5 g of zinc oxide (French Process with a purity of >99.7%) in 600.3 g of fatty acid (acid value 209) in a Parr reactor, adding and dissolving 0.18 g of adipic acid catalyst, heating the reaction mixture to the induction temperature of the reaction and mixing and reacting the mixture under pressure of 35 psig for 20 minutes, venting the reaction vessel to atmospheric pressure while maintaining the temperature above the melting point of the resultant organic acid metal salt reaction product. Premix 3 and Premix 4 were flaked and milled for the experiments containing Premix 3 and 4 in Table 3 below.

Example 2

TABLE 1

Low linear density polyethylene (LLDPE) compositions.

| Entry | Premix # 1 (ppm) | Premix #2 (ppm) | Irganox 1076 (ppm) | TNPP (ppm) | Zinc Oxide (ppm) |
|---|---|---|---|---|---|
| 1 | — | — | — | — | — |
| 2 | — | — | 500 | 1,000 | 150 |
| 3 | — | — | 500 | — | — |
| 4 | — | — | 500 | — | 150 |
| 5 | 300 | — | 500 | 500 | — |
| 6 | 300 | — | 500 | — | — |
| 7 | — | 300 | 500 | 500 | — |
| 8 | — | 300 | 500 | — | — |

Entry 1: No additives
Entry 2: Control
Irganox ® 1076: octadecyl 3,5-di-tert-butyl-4-hydroxyhydrocinnamate
TNPP: tris(nonylphenyl) phosphite Entry 1 of Table 1 was an unstabilized LLDPE resin containing about 20-30 ppm residual chloride. For entries 2-8, the stabilizer additives were tumble-blended into the LLDPE resin in a Henschel mixer and the resulting stabilized mixtures were processed for testing. A zero pass run was performed at 190° C. with nitrogen purge to simulate pelleting. A 5-pass extrusion was performed using a Kraus-Maffei Berstorff ZE 25A×26D UTXi® Twin Screw Extruder conducted at 225° C. without nitrogen purging and Melt Flow Rate (MFR) and Yellowness Index (YI) were measured after the first, third, and fifth pass. Yellowness Index (YI) was measured on a Hunter Lab ColorQuest XE colorimeter and Melt Flow Rate (MFR) was measured on a Tinius Olsen Extrusion Plastometer.

In reference to FIG. 1, the invention stabilizer compositions yield a significantly improved Yellowness Index after multiple heat histories. Unexpectedly, the examples of Premix 1 and Premix 2 replacing the phosphite show better yellowness than the industry standard control using TNPP (tris(nonylphenyl)phosphite). Premix 1 and Premix 2 also showed the same improved yellowness index result when the premixture replaced half of the TNPP phosphite. Additionally, Premix 2 used in the stabilizer composition showed improved color.

Figure 2:
FIG. 2 is a bar graph showing a comparison of Melt Flow Rate (MFR) results from a multi-pass extrusion study of unstabilized and stabilized LLDPE compositions.

In reference to FIG. 2, the invention stabilizer compositions yield more stable Melt Flow Rate after multiple-extrusion processing than the control group. When the invention was used to replace half of the control phosphite TNPP, the results show melt flow stability equivalent to the control. Thus, the stabilizer composition may be used in conjunction with phosphites.

Example 1

TABLE 2

High density polyethylene (HDPE) compositions.

| Entry | Premix #1 (ppm) | Premix #2 (ppm) | Irganox 1010 (ppm) | Irgafos 168 (ppm) | CaSt2 (ppm) | Ultranox 626 or equiv (ppm) |
|---|---|---|---|---|---|---|
| 1 | — | — | — | — | — | — |
| 2 | — | — | 1,000 | — | — | — |
| 3 | — | — | 1,000 | 1,000 | — | — |
| 4 | 500 | — | 1,000 | 500 | — | — |
| 5 | 500 | — | 1,000 | — | — | — |
| 6 | — | 500 | 1,000 | 500 | — | — |
| 7 | — | 500 | 1,000 | — | — | — |
| 8 | — | — | 500 | — | 500 | 500 |
| 9 | — | — | 500 | 500 | 500 | — |

Entry 1: No additives
Entry 3: Control #1
Entry 8: Control #2
Entry 9: Control #3
Irganox ® 1010: pentaerythrityl-tetrakis(3-(3',5'-di-tert-butyl-4-hydroxyphenyl)-propionate
Irgafos ® 168: Tris (2,4-di-tert-butylphenyl) phosphite
Ultranox ® 626: Bis (2,4-di-t-butylphenyl) Pentraerythritol Diphosphite Entry 1 of Table 2 was an unstabilized HDPE resin. For entries 2-13, the stabilizer additives were tumble blended into the HDPE resin in a Henschel mixer and the resulting stabilized mixtures were processed for testing. A zero pass run was performed at 210° C. with nitrogen purge to simulate pelleting. A 5-pass extrusion was performed using a KrausMaffei Berstorff ZE 25A×26D UTXi® Twin Screw Extruder conducted at 250° C. without nitrogen purging and MFI and YI were measured after the first, third, and fifth pass.

Figure 3:
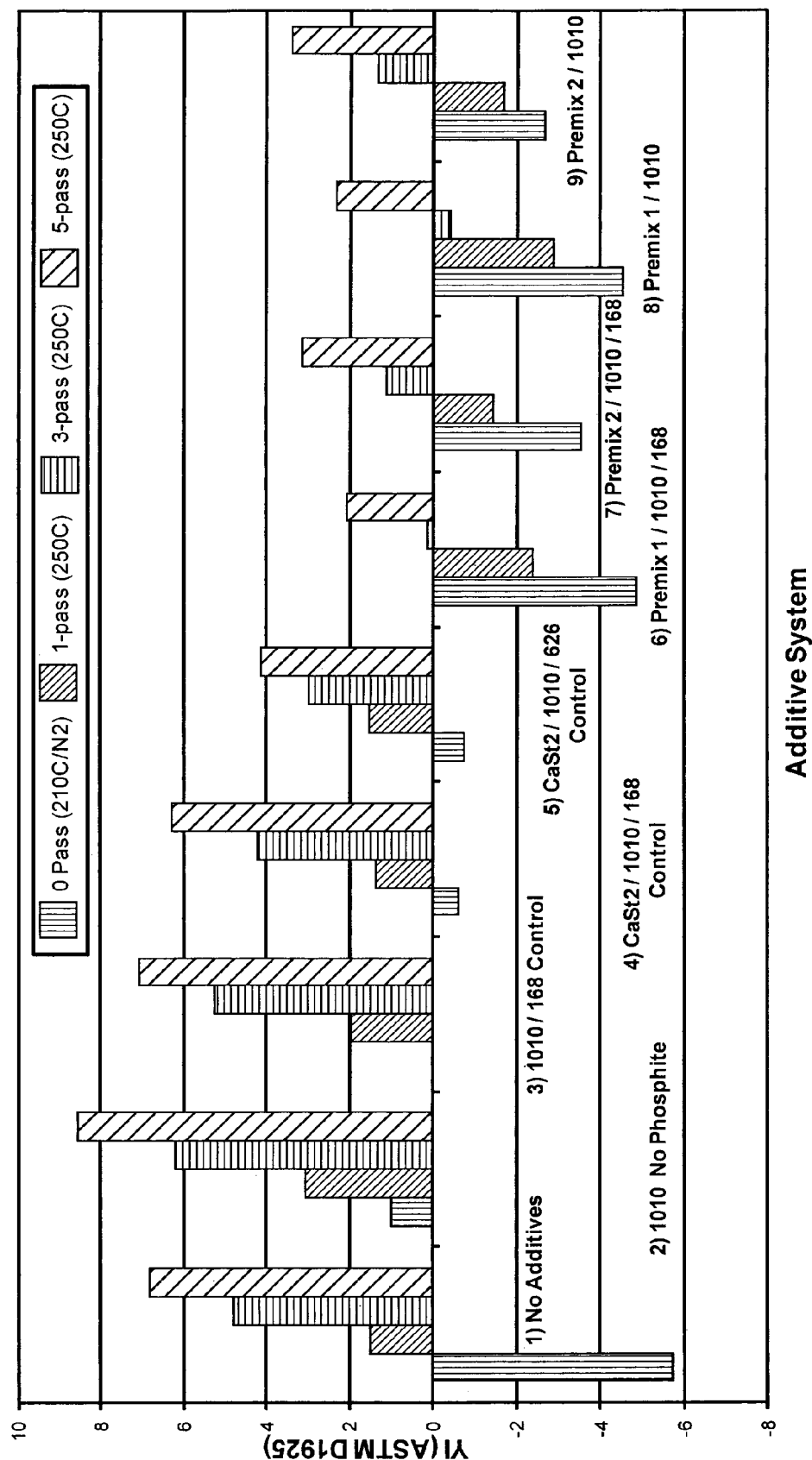
FIG. 3 is a bar graph showing a comparison of YI results from a multi-pass extrusion study of unstabilized and stabilized high density polyethylene (HDPE) compositions.

In reference to FIG. 3, the stabilizer composition was used to replace half or all of the industry standard phosphite tris(2,4-di-tert-butylphenyl)phosphite, CAS Number 31570-04-4. The Yellowness Index results when using the invention clearly shows superior color hold after multiple passes through the extruder. The whiteness of the polymer after thermoprocessing is greatly improved by the invention.

Figure 4:
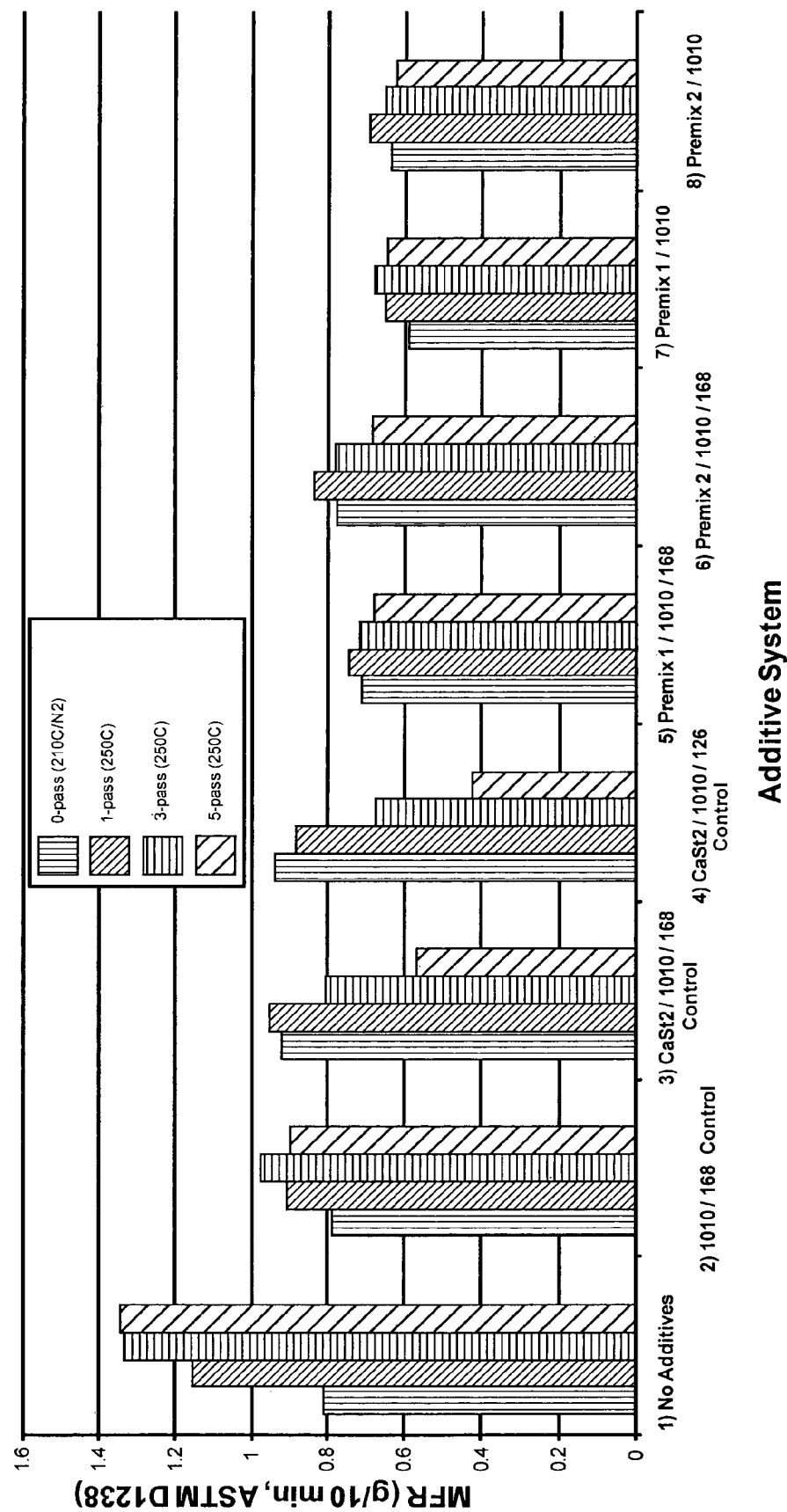
FIG. 4 is a bar graph showing a comparison of MFR results from a multi-pass extrusion study of unstabilized and stabilized HDPE compositions.

In reference to FIG. 4, the stabilizer composition invention was used to replace half or all of the industry standard phosphite tris(2,4-di-tert-butylphenyl)phosphite, CAS Number 31570-04-4. The invention stabilizer composition yielded superior Melt Flow Rate stability versus the industry standard control phosphite.

Example 4

TABLE 3

Polypropylene (PP) Compositions

| Entry | Premix #1 (ppm) | Premix #2 (ppm) | Premix #3 (ppm) | Premix #4 (ppm) | Irganox 1010 (ppm) | Irgafos 168 (ppm) | CaSt2 (ppm) | Ultranox 626 or equiv (ppm) |
|---|---|---|---|---|---|---|---|---|
| 1 | — | — | — | — | — | — | — | — |
| 2 | — | — | — | — | 500 | 500 | 500 | — |
| 3 | — | — | — | — | 500 | — | 500 | 500 |
| 4 | 500 | — | — | — | 500 | — | — | — |
| 5 | — | — | 500 | — | 500 | — | — | — |
| 6 | — | 500 | — | — | 500 | — | — | — |
| 7 | — | — | — | 500 | 500 | — | — | — |
| 8 | 500 | — | — | — | 500 | 500 | — | — |
| 9 | — | — | 500 | — | 500 | 500 | — | — |
| 10 | — | 500 | — | — | 500 | 500 | — | — |
| 11 | — | — | — | 500 | 500 | 500 | — | — |
| 12 | 500 | — | — | — | 500 | — | — | 500 |
| 13 | — | — | 500 | — | 500 | — | — | 500 |
| 14 | — | 500 | — | — | 500 | — | — | 500 |
| 15 | — | — | — | 500 | 500 | — | — | 500 |

Entry 1: No additives
Entry 2: Control #1
Entry 3: Control #2
Irganox ® 1010: pentaerythrityl-tetrakis(3-(3',5'-di-tert-butyl-4-hydroxyphenyl)-propionate
Irgafos ® 168: Tris (2,4-di-tert-butylphenyl) phosphite
Ultranox ® 626: Bis (2,4-di-t-butylphenyl) Pentraerythritol Diphosphite Entry 1 of Table 3 was an unstabilized PP resin. For entries 2-8, the stabilizer additives were tumble blended into the HDPE resin in a Henschel mixer and the resulting stabilized mixtures were processed for testing. A 5-pass extrusion was performed using a KrausMaffei Berstorff ZE 25A×26D UTXi® Twin Screw Extruder conducted at 190° C. without nitrogen purging and MFI and YI were measured after the first, third, and fifth pass.

Figure 5:
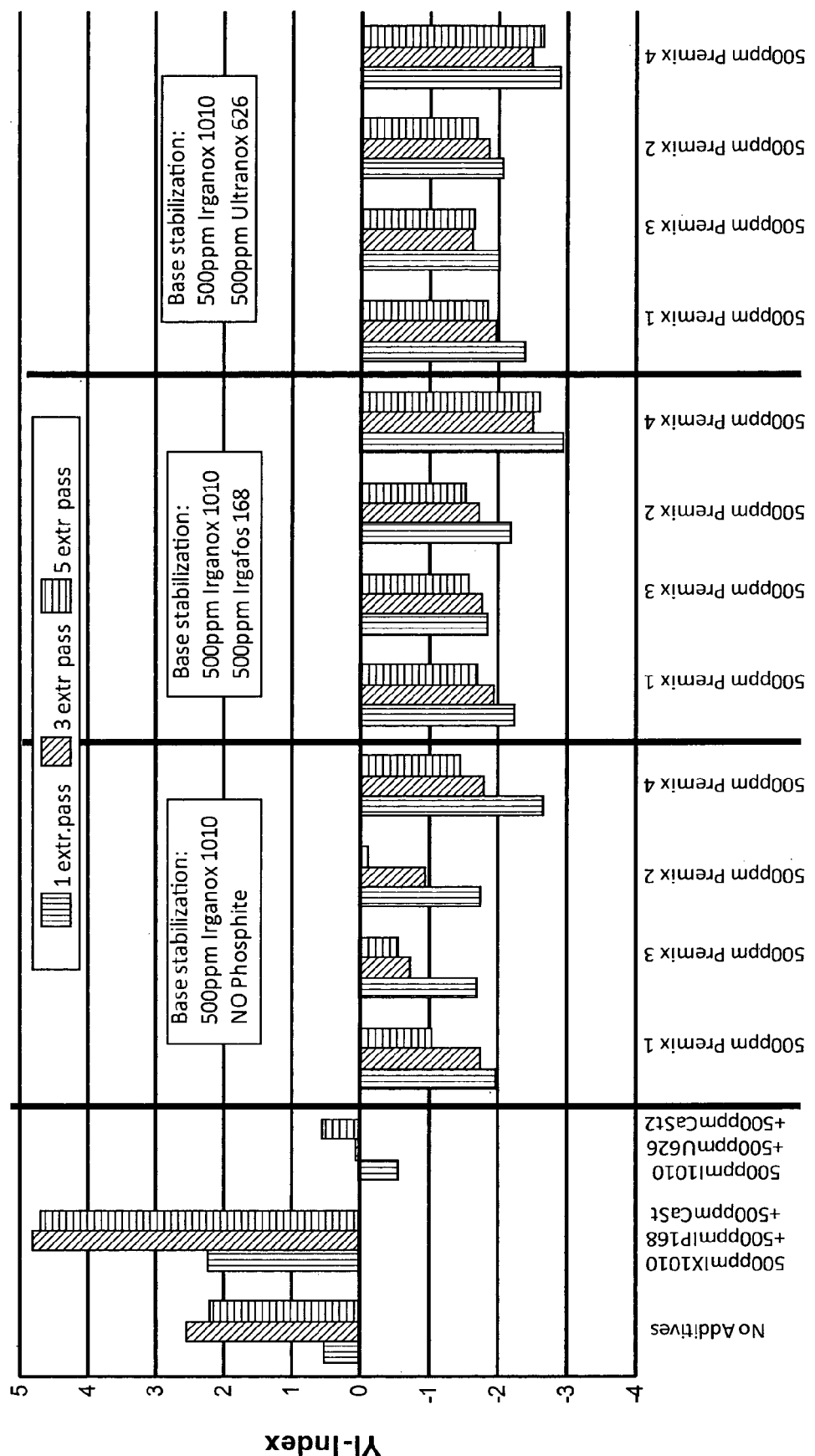
FIG. 5 is a bar graph showing a comparison of YI results from a multi-pass extrusion study of unstabilized and stabilized polypropylene (PP) compositions.

In reference to FIG. 5, four different stabilizer compositions in accordance with embodiments of the present invention were evaluated. The stabilizer compositions replaced all of the industry standard phosphites (e.g., tris(2,4-di-tert-butylphenyl)phosphite, CAS Number [31570-04-4] and bis (2,4-di-t-butylphenyl)pentraerythritol diphosphite, CAS Number [26741-53-7]). The Yellowness Index results when using either of the four invention compositions clearly show superior color hold after multiple passes through the extruder versus the control. The whiteness of the polymer after thermoprocessing is greatly improved by the invention. Advantageously, the stabilizer composition used in conjunction with the two phosphites showed further improvement in color of the polymer after multiple extrusion passes.

Figure 6:
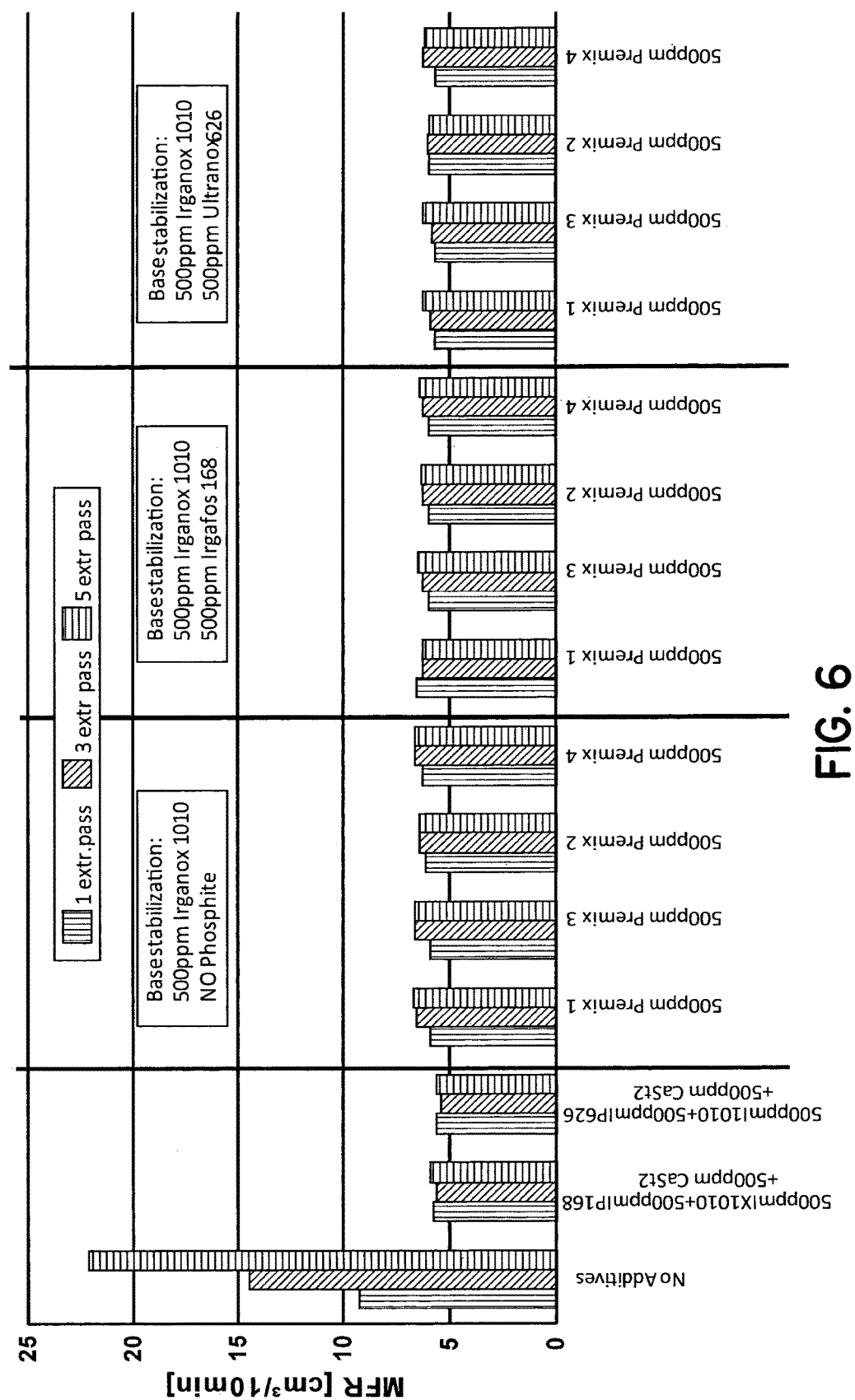
FIG. 6 is a bar graph showing a comparison of Melt Flow Rate (MFR) results from a multi-pass extrusion study of unstabilized and stabilized PP compositions.

In reference to FIG. 6, four different stabilizer compositions were evaluated. The stabilizer compositions replaced all of the industry standard phosphites (e.g., tris(2,4-di-tert-butylphenyl)phosphite, CAS Number [31570-04-4], and bis (2,4-di-t-butylphenyl) pentraerythritol diphosphite, CAS Number [26741-53-7]). The invention stabilizer composition yielded equivalent Melt Flow Rate stability versus the industry standard control phosphites.

TABLE 4

Chrome catalyzed HDPE compositions.

| Entry | Premix 1 (ppm) | Irganox 1010 (ppm) | Irgafos 168 (ppm) | CaSt2 (ppm) |
|---|---|---|---|---|
| 1 | — | — | — | — |
| 2 | — | 1000 | 1000 | — |
| 3 | — | 1000 | 500 | 500 |
| 4 | 2000 | — | — | — |
| 5 | 500 | 1000 | 500 | — |
| 6 | 1000 | 1000 | — | — |

Entry 1: No additives
Entry 2: Control
Entry 3: Control
Irganox ® 168: tris(2,4-di-tert-butylphenyl) phosphite
CaSt2: CODE 5900

The entries of Table 4 were based on unstabilized chrome catalyzed HDPE with the appropriate concentration of additives defined in Table 4. The mixtures were prepared by combining a total of 40 g of resin and additives in a container and shaking to combine. The 40 g was added to a 3 piece 3 zone mixing bowl attached to a C. W. BrabenderIntelli-Torque Plasti-Corder Torque Rheometer. The mixing bowl had been preheated to 225° C. and force was zeroed at 90 rpm. The mixture was fed into the mixing bowl using a ram and mixed with the lid open and without nitrogen purge for 40 minutes.

Three stabilizer compositions in accordance with the embodiments of the present invention were evaluated. The stabilizer composition replaced all or part of the industry standard phosphite (e.g. tris(2,4-di-tert-butylphenyl)phosphite CAS Number [31570-04-4]). Results show that the addition of the stabilizer composition invention surprisingly improved the stability of the resin by delaying cross-linking.

TABLE 5

Chrome catalyzed HDPE compositions using premixes.

| Entry | Premix 1 (ppm) | Premix 5 (ppm) | Premix 6 (ppm) | Premix 7 (ppm) | Irganox 1010 (ppm) | Irganox 168 (ppm) |
|---|---|---|---|---|---|---|
| 1 | 500 | — | — | — | 1000 | 500 |
| 2 | — | 1500 | — | — | — | 500 |
| 3 | — | — | 1500 | — | — | 500 |
| 4 | — | — | — | 1500 | — | 500 |

Irganox ® 168: tris(2,4-di-tert-butylphenyl) phosphite
Irganox ® 1010: tetrakis[methylene-3-(3,5-di-tert-butyl-4-hydroxyphenyl)propionate]methane Premix 5 was prepared by predispersing 266.5 g of zinc stearate (CODE 8565), 66.8 g of zinc oxide (French Process with a purity of >99.7%) and 666.6 g of phenolic antioxidant (e.g. tetrakis[methylene-3-(3,5-di-tert-butyl-4-hydroxyphenyl)propionate]methane CAS Number 6683-19-8) before adding to a preheated Parr Reactor, which was heated to a temperature of about 130° C.-150° C. The mixture was stirred under nitrogen for 30 minutes to melt and intimately disperse the additives. The molten dispersion of premixture was flaked to convert it to a solid form and coarsely milled for ease of use in lab experiments.

Premix 6 was prepared by melting 266.5 g of zinc stearate (CODE 8565) in a preheated (at about 130° C.-150° C.) Parr Reactor under nitrogen for 15 minutes. Once fully melted 666.6 g of phenolic antioxidant (e.g. tetrakis[methylene-3-(3,5-di-tert-butyl-4-hydroxyphenyl)propionate]methane CAS Number 6683-19-8) was added to the molten zinc stearate and stirred 25 minutes until fully melted. Finally 66.8 g of zinc oxide (French Process with a purity of >99.7%) was added and dispersed with vigorous stirring for 5 minutes. The molten dispersion of premixture was flaked to convert it to a solid form and coarsely milled for ease of use in lab experiments.

Premix 7 was prepared by melting 333.3 g of Premix 1 in a preheated (at about 130° C.-150° C.) Parr Reactor under nitrogen for 30 minutes. Once fully melted 666.6 g of phenolic antioxidant (e.g. tetrakis[methylene-3-(3,5-di-tert-butyl-4-hydroxyphenyl)propionate]methane CAS Number 6683-19-8) was added to the molten premix 1 and stirred for 25 minutes until fully melted. The molten dispersion of premixture was flaked to convert it to a solid form and coarsely milled for ease of use in lab experiments.

The entries of Table 5 were based on unstabilized chrome catalyzed HDPE with the appropriate concentration of additives defined in Table 5. The mixtures were prepared by combining a total of 40 g of resin and additives in a container and shaking to combine. The 40 g was added to a 3 piece 3 zone mixing bowl attached to a C. W. Brabenderintelli-Torque Plasti-Corder Torque Rheometer. The mixing bowl had been preheated to 225° C. and force was zeroed at 90 rpm. The mixture was fed into the mixing bowl using a ram and mixed with the lid open and without nitrogen purge for 40 minutes.

Four stabilizer compositions in accordance with the embodiments of the present invention were evaluated. Results show that the stabilizer compositions of the present invention may be combined with other additives such as tetrakis[methylene-3-(3,5-di-tert-butyl-4-hydroxyphenyl) propionate]methane CAS Number 6683-19-8 to form a more complicated premixture. These premixtures were found to give nearly identical results showing that the order of addition was not as important as method by which the components were brought together.

TABLE 6

Chrome catalyzed HDPE compositions using alternate premix forming methods.

| Entry | Premix 5 (ppm) | Premix 8 (ppm) | Premix 9 (ppm) | Premix 10 (ppm) | Irgafos 168 (ppm) |
|---|---|---|---|---|---|
| 1 | 1500 | — | — | — | 500 |
| 2 | — | 1500 | — | — | 500 |
| 3 | — | — | 1500 | — | 500 |
| 4 | — | — | — | 1500 | 500 |

Irganox® 168: tris(2,4-di-tert-butylphenyl) phosphite

Premix 8 was prepared by predispersing 6.66 g of zinc stearate (CODE 8565), 1.67 g of zinc oxide (French Process with a purity of >99.7%) and 16.67 g of phenolic antioxidant (e.g. tetrakis[methylene-3-(3,5-di-tert-butyl-4-hydroxyphenyl)propionate]methane CAS Number 6683-19-8) in a FlackTek™ Max 100 jar. The jar was shaken for 3 minutes to fully disperse the components of the mixture without shear or melting.

Premix 9 was prepared by predispersing 6.66 g of zinc stearate (CODE 8565), 1.67 g of zinc oxide (French Process with a purity of >99.7%) and 16.67 g of phenolic antioxidant (e.g. tetrakis[methylene-3-(3,5-di-tert-butyl-4-hydroxyphenyl)propionate]methane CAS Number 6683-19-8) using high shear in a KitchenAid® coffee grinder (Model No. BCG111OBO). The mixture was milled for three one minute periods to provide high shear mixing while preventing the additives from melting during grinding.

Premix 10 was prepared by predispersing 6.66 g of zinc stearate (CODE 8565), 1.67 g of zinc oxide (French Process with a purity of >99.7%) and 16.67 g of phenolic antioxidant (e.g. tetrakis[methylene-3-(3,5-di-tert-butyl-4-hydroxyphenyl)-propionate]methane CAS Number 6683-19-8) in a FlakTek Max 100 jar. The mixture was then mixed using a FlackTek™ Hauschild Speed Mixer with 50 g of glass beads to further mill the premix. The samples were milled for six 30 second intervals at 1,000 rpm to allow for low shear mixing without melting.

The entries of Table 6 were based on unstabilized chrome catalyzed HDPE with the appropriate concentration of additives defined in Table 6. The mixtures were prepared by combining a total of 40 g of resin and additives in a container and shaking to combine. The 40 g was added to a 3 piece 3 zone mixing bowl attached to a C. W. Brabenderintelli-Torque Plasti-Corder Torque Rheometer. The mixing bowl had been preheated to 225° C. and force was zeroed at 90 rpm. The mixture was fed into the mixing bowl using a ram and mixed with the lid open and without nitrogen purge for 40 minutes.

A sample 1 is prepared in the embodiment of the invention. Samples 2-4 were compositionally equivalent to sample 1 but were not prepared in accordance with the principles of the invention (i.e., without high shear or melting). Results show that sample 1 surprisingly increased the stability of the HDPE resin compared to samples 2-4 despite all four samples having identical compositions.

TABLE 7

Acrylonitrile Butadiene Styrene (ABS) compositions.

| Entry | 1076 (ppm) | EBS (ppm) | MgO (ppm) | Mg St (ppm) | ZnO (ppm) | Zn St (ppm) | Premix 11 (ppm) | Premix 12 (ppm) | Premix 1 (ppm) |
|---|---|---|---|---|---|---|---|---|---|
| 1 | — | — | — | — | — | — | — | — | — |
| 2 | 1000 | 1000 | 1000 | — | — | — | — | — | — |
| 3 | — | — | — | — | — | — | 3000 | — | — |
| 4 | 1000 | 1000 | 500 | 1000 | — | — | — | — | — |
| 5 | — | — | — | — | — | — | — | 3000 | — |
| 6 | 1000 | 1000 | — | — | — | — | — | — | 1000 |
| 7 | 1000 | 1000 | — | — | 200 | 800 | — | — | — |

Entry 1: No Additives
Entry 2: Control
Entry 4: Control
EBS: Ethylene bis-stearamide
1076: Irganox® 1076, Octadecyl-3-(3,5-di-tert-butyl-4-hydroxyphenyl)propionate
Zinc Stearate: CODE 8565

The entries of Table 7 were based on unstabilized acrylonitrile butadiene styrene (ABS) with the appropriate concentration of additives defined in Table 7. The mixtures were prepared by combining a total of 50 g of resin and additives in a container and shaking to combine. The 50 g was added to a 3 piece 3 zone mixing bowl attached to a C. W. Brabenderintelli-Torque Plasti-Corder Torque Rheometer. The mixing bowl had been preheated to 225° C. and force was zeroed at 90 rpm. The mixture was fed into the mixing bowl using a ram and mixed with the lid open and without nitrogen purge for 40 minutes.

Two stabilizer compositions (entries 5 and 6 in Table 7), which were prepared in accordance with the embodiments of the present invention, were evaluated. These samples showed that the combined additives described in the invention surprisingly further improved the stability of the resin over the addition of individual additives despite having identical compositions. Further, Sample 3, which does not encompass the invention, was prepared under identical methods to the invention but had poorer stability than the individual components in Sample 2.

Premix 11 was prepared by predispersing 200 g of magnesium oxide, 200 g of ethylenebis-stearamide and 200 g of phenolic antioxidant (e.g. octadecyl-3-(3,5-di-tert-butyl-4-hydroxyphenyl)propionate CAS Number 2082-79-3) before adding to a preheated (at about 150° C.-160° C.) Parr Reactor. The mixture was stirred under nitrogen for 30 minutes to melt and intimately disperse the additives. The molten dispersion of premixture was flaked to convert it to a solid form and coarsely milled for ease of use in lab experiments.

Premix 12 was prepared by predispersing 100 g of magnesium oxide, 200 g of magnesium stearate, 200 g of ethylene bis-stearamide and 200 g of phenolic antioxidant (e.g. Octadecyl-3-(3,5-di-tert-butyl-4-hydroxyphenyl)propionate CAS Number 2082-79-3) before adding to a preheated (at about 150° C.-160° C.) Parr Reactor. The mixture was stirred under nitrogen for 30 minutes to melt and intimately disperse the additives. The molten dispersion of premixture was flaked to convert it to a solid form and coarsely milled for ease of use in lab experiments.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and/or method and examples shown and described. The various features of exemplary embodiments described herein may be used in any combination. Accordingly, departures may be made from such details without departing from the scope of the general inventive concept.

What is claimed is:

1. A method for preparing a stabilized polymer composition, the stabilized polymer composition comprising:
   a polymer selected from the group consisting of a polyolefin, a styrenic polymer, a poly(meth)acrylate, and combinations thereof; and
   about 50 parts per million (ppm) to about 20,000 ppm of a stabilizer composition, comprising:
   (a) about 1 wt % to about 60 wt % based on the total weight of the stabilizer composition of an antacid which does not fall under the compounds of (b), selected from the group consisting of metal oxides, metal hydroxides, metal carbonates, metal bicarbonates, natural hydrotalcites, synthetic hydrotalcites, natural hydrocalumites, synthetic hydrocalumites, pyrocatecholates, zeolites, silicates, and combinations thereof;
   (b) about 10 wt % to about 69 wt % based on the total weight of the stabilizer composition of an organic acid-metal salt having a general formula M1Ym,
      wherein M1 is selected from the group consisting of bismuth, calcium, zinc, magnesium, lithium, sodium, potassium, barium, strontium, aluminum, cerium, praseodymium, neodymium, promethium, samarium, europium, gadolinium, terbium, dysprosium, holmium, erbium, thulium, ytterbium, and combinations thereof;
      wherein Y is a conjugate base of an organic acid, having from six to twenty-four carbon atoms, selected from the group consisting of a linear or branched organic acid, a saturated or unsaturated organic acid, a substituted or unsubstituted organic acid, an aliphatic organic acid, an aromatic organic acid, an alicyclic organic acid, an oxygen-containing heterocyclic organic acid, dicarboxylic acid, polyprotic carboxylic acids, and combinations thereof; and
      wherein m is an integer from 1 to 3; and
   (c) about 30 wt % to about 89 wt % based on the total weight of the stabilizer composition of a primary antioxidant selected from the group consisting of sterically hindered phenolic compounds, hindered amine compounds, hydroxylamine compounds, and combinations thereof;
   wherein the stabilized polymer composition is free or substantially free of phosphite and phosphonite stabilizers; and
   wherein the method for preparing the stabilized polymer composition comprises:
   (1) preparing a first premixture comprising the antacid (a) and the organic acid-metal salt (b) or the primary antioxidant (c) or both;
   (2) intimately mixing the first premixture obtained from step (1) at an elevated temperature sufficient to provide a molten mixture comprising a dispersion of the antacid (a) in the organic acid-metal salt (b) or the primary antioxidant (c) or both;
   (3) optionally, lowering a temperature of the molten mixture to provide a second premixture in solid form; and
   (4) combining the molten mixture of step (2) or the second premixture in solid form of step (3) with the polymer and at least one additional ingredient of (b) or (c), if not already present.

2. The method of claim 1, wherein the first premixture comprises the antacid (a) and the organic acid-metal salt (b), which provides the molten mixture comprising a dispersion of the antacid in the organic acid-metal salt.

3. The method of claim 2, wherein the method comprises step (3) and wherein step (3) of the method includes lowering the temperature of the molten mixture to provide the second premixture in solid form comprising a dispersion of the antacid (a) in the organic acid-metal salt (b).

4. The method of claim 1, wherein the first premixture comprises the antacid (a) and the primary antioxidant (c), which provides the molten mixture comprising a dispersion of the antacid (a) in the primary antioxidant (c).

5. The method of claim 4, wherein the method comprises step (3) and wherein step (3) of the method includes lowering the temperature of the molten mixture to provide the second premixture in solid form comprising a dispersion of the antacid (a) in the primary antioxidant (c).

6. The method of claim 2, wherein the second premixture in solid form and the primary antioxidant (c) is mixed with the polymer.

* * * * *